US011485095B2

(12) United States Patent
Doisneau

(10) Patent No.: US 11,485,095 B2
(45) Date of Patent: Nov. 1, 2022

(54) COMPOSITE AND POWER TRANSMISSION BELT

(71) Applicant: COMPAGNIE GENERALE DES ETABLISSEMENTS MICHELIN, Clermont-Ferrand (FR)

(72) Inventor: David Doisneau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 393 days.

(21) Appl. No.: 16/651,186

(22) PCT Filed: Sep. 21, 2018

(86) PCT No.: PCT/FR2018/052312
§ 371 (c)(1),
(2) Date: Mar. 26, 2020

(87) PCT Pub. No.: WO2019/063917
PCT Pub. Date: Apr. 4, 2019

(65) Prior Publication Data
US 2020/0269524 A1    Aug. 27, 2020

(30) Foreign Application Priority Data
Sep. 29, 2017    (FR) ...................................... 1759109

(51) Int. Cl.
*B29C 70/08*        (2006.01)
*B29D 29/10*        (2006.01)
(Continued)

(52) U.S. Cl.
CPC .......... *B29C 70/086* (2013.01); *C09J 161/12* (2013.01); *C09J 171/10* (2013.01); *F16G 5/08* (2013.01);
(Continued)

(58) Field of Classification Search
CPC ...... B29C 70/086; B29D 29/08; B29D 29/10; B29D 29/103; B29D 29/106;
(Continued)

(56) References Cited

U.S. PATENT DOCUMENTS 2,776,948 A    1/1957 Snyder
6,251,977 B1   6/2001 Georget et al.
(Continued)

FOREIGN PATENT DOCUMENTS

EP    0964030 A1    12/1999
WO    2015/007641 A1    1/2015
(Continued)

OTHER PUBLICATIONS

International Search Report dated Jan. 10, 2019, in corresponding PCT/FR2018/052312 (4 pages).

*Primary Examiner* — Michael A Tolin
(74) *Attorney, Agent, or Firm* — Venable LLP

(57) ABSTRACT

A composite comprises: a reinforcing element (10), an adhesive layer (14) made from an adhesive composition, and an elastomeric body made from an elastomeric matrix comprising an ethylene/alpha-olefin type elastomer and/or a polychloroprene elastomer. The adhesive composition comprises a resin based: on a polyphenol comprising an aromatic ring bearing two hydroxyl functions in the meta position relative to one another, the two positions ortho to one of the hydroxyl functions being unsubstituted; and/or on a monophenol comprising a six-membered aromatic ring bearing a single hydroxyl function, the two ortho positions being unsubstituted, or an ortho position and the para position being unsubstituted, and on a compound comprising an
(Continued)

aromatic ring bearing two functions, one of these functions being a hydroxymethyl function and the other being an aldehyde function or a hydroxymethyl function.

15 Claims, 3 Drawing Sheets

(51) Int. Cl.
*C09J 161/12* (2006.01)
*C09J 171/10* (2006.01)
*F16G 5/08* (2006.01)
*F16G 5/20* (2006.01)
*B29K 23/00* (2006.01)
*B29L 31/00* (2006.01)

(52) U.S. Cl.
CPC ............... *F16G 5/20* (2013.01); *B29D 29/103* (2013.01); *B29K 2023/16* (2013.01); *B29L 2031/7094* (2013.01)

(58) Field of Classification Search
CPC ........ B29K 2023/16; B29L 2031/7094; C08G 4/00; C08G 8/04; C08G 8/06; C08J 5/06; C08J 5/127; C08J 2300/26; C08J 2311/00; C08J 2323/16; C08L 61/06; C08L 61/12; C09J 161/06; C09J 161/12; C09J 171/08; C09J 171/10; F16G 1/08; F16G 1/10; F16G 5/06; F16G 5/08; F16G 5/20
See application file for complete search history.

(56) References Cited

U.S. PATENT DOCUMENTS

| | | | |
|---|---|---|---|
| 10,266,633 | B2 | 4/2019 | Xu et al. |
| 10,267,380 | B2 | 4/2019 | Franchini et al. |
| 10,544,292 | B2 | 1/2020 | Doisneau et al. |
| 10,544,298 | B2 | 1/2020 | Doisneau et al. |
| 2016/0251550 | A1 | 9/2016 | Michoud et al. |
| 2016/0355631 | A1 | 12/2016 | Xu et al. |
| 2017/0023099 | A1 | 1/2017 | Franchini et al. |
| 2017/0166010 | A1 | 6/2017 | Michoud et al. |
| 2017/0166011 | A1 | 6/2017 | Michoud et al. |
| 2017/0362370 | A1 | 12/2017 | Doisneau et al. |
| 2018/0118983 | A1 | 5/2018 | Doisneau et al. |
| 2018/0362754 | A1 | 12/2018 | Thuilliez et al. |
| 2019/0112512 | A1 | 4/2019 | Doisneau et al. |
| 2019/0119535 | A1 | 4/2019 | Doisneau |
| 2019/0145493 | A1 | 5/2019 | Doisneau et al. |
| 2020/0031980 | A1 | 1/2020 | Doisneau et al. |
| 2020/0231848 | A1 | 7/2020 | Michoud et al. |
| 2020/0255966 | A1 | 8/2020 | Michoud et al. |

FOREIGN PATENT DOCUMENTS

| | | | |
|---|---|---|---|
| WO | 2015/123781 A1 | 8/2015 | |
| WO | 2015/151010 A1 | 10/2015 | |
| WO | WO-2017198967 A1 * | 11/2017 | ............. B29D 29/10 |

* cited by examiner

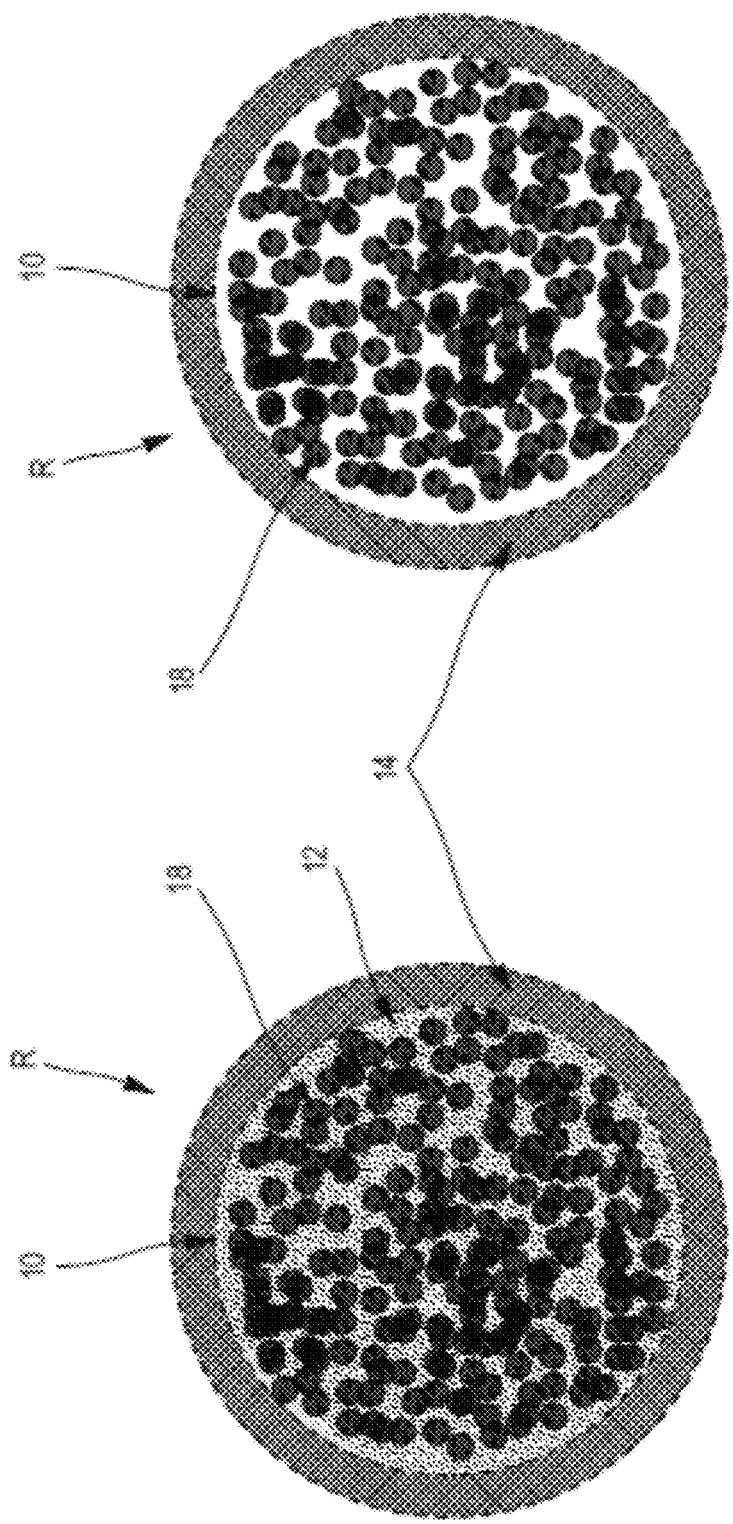

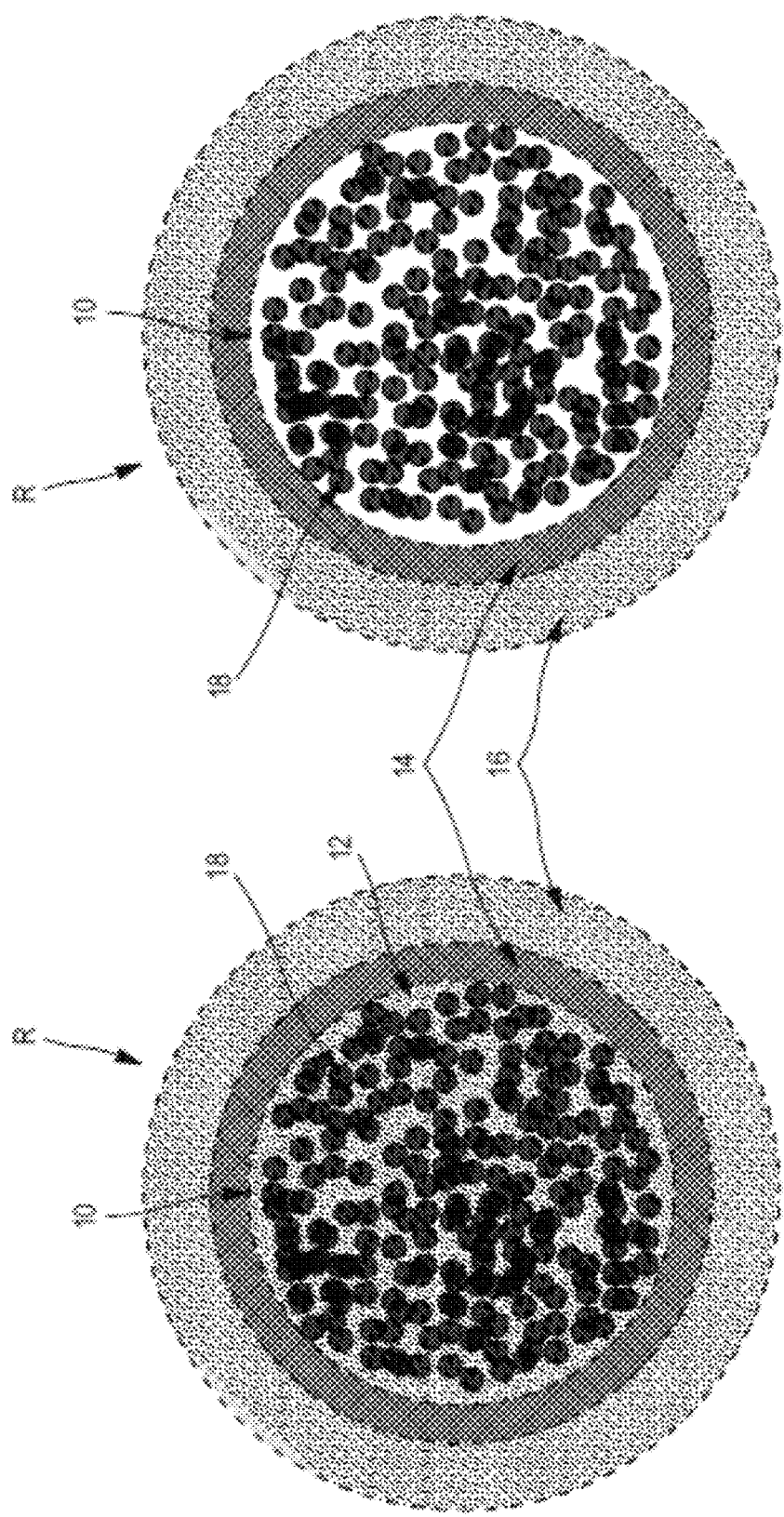

COMPOSITE AND POWER TRANSMISSION BELT

BACKGROUND

The field of the present invention is that of composites comprising an elastomeric material and reinforcing elements embedded in this elastomeric material. The present invention relates more particularly to such composites that form power transmission belts.

Known from the prior art, in particular from WO2015/151010, is a composite that forms a power transmission belt comprising an elastomeric material comprising at least one elastomer of ethylene/alpha-olefin type, for example EPDM, and reinforcing elements embedded in this elastomeric material.

Each reinforcing element is a multifilament ply of elementary textile monofilaments. Each reinforcing element is impregnated by a composition that ensures the cohesion of the monofilaments of the multifilament ply with one another and that makes it possible to prevent the fraying of each reinforcing element. This cohesion composition, forming a layer at the heart of the reinforcing element, is derived from the reaction of one or more isocyanates and comprises for example a uretidinedione, an isocyanurate or a mixture of these two compounds. Each impregnated reinforcing element is coated with an adhesive layer. The adhesive layer comprises an adhesive composition of RFL (resorcinol-formaldehyde latex) type. These RFL-type adhesive compositions comprise, in a well-known way, a thermosetting phenolic resin, obtained by the condensation of resorcinol with formaldehyde, and one or more latices of diene rubber in aqueous solution.

However, it is desirable to reduce, or even eliminate in the long run, formaldehyde from elastomer composites due to the environmental impact of these composites and the recent developments in regulations, especially European regulations, relating to this type of compound.

The aim of the invention is to provide composites comprising novel adhesive systems that are simple to implement and make it possible to maintain, or even to improve, the endurance of these composites.

SUMMARY

One subject of the invention is a composite comprising:
at least one reinforcing element,
an adhesive layer made from an adhesive composition and coating the reinforcing element,
an elastomeric body made from an elastomeric matrix comprising at least one elastomer selected from the group consisting of an ethylene/alpha-olefin type elastomer, a polychloroprene elastomer, and the mixtures of these elastomers and embedded in which elastomeric body is the reinforcing element coated with the adhesive layer,
the adhesive composition comprising at least one resin based:
  on at least one aromatic polyphenol comprising at least one aromatic ring bearing at least two hydroxyl functions in the meta position relative to one another, the two positions ortho to at least one of the hydroxyl functions being unsubstituted, and/or
  on at least one aromatic monophenol comprising at least one six-membered aromatic ring bearing a single hydroxyl function,
    the two positions ortho to the hydroxyl function being unsubstituted, or
    at least one position ortho to and the position para to the hydroxyl function being unsubstituted, and
  on at least one aromatic compound comprising at least one aromatic ring bearing at least two functions, one of these functions being a hydroxymethyl function and the other being an aldehyde function or a hydroxymethyl function.

During its research, the applicant has discovered an aqueous adhesive composition not using free formaldehyde which makes it possible to meet the above objective.

The adhesive composition is easy to manufacture and to implement, notably owing to the very high solubility of the aromatic compound due to the presence of at least one hydroxymethyl function that further constitutes a reactive site for the formation of the resin. This ease of manufacture and of implementation results in the absence of necessarily requiring vigorous stirring during the mixing of the resin in the aqueous composition, which vigorous stirring would require expensive apparatus and would increase the duration of the process.

Furthermore, the adhesive composition makes it possible to give the composite an improved endurance.

BRIEF DESCRIPTION OF THE FIGURES

The invention will be better understood on reading the following description, given solely by way of non-limiting example and with reference to the drawings, in which:

FIGS. 2A and 2B show two variants of coated reinforcing elements R; and

FIGS. 3A and 3B show two other variants of coated reinforcing elements R.

DETAILED DESCRIPTION

Figure 1:
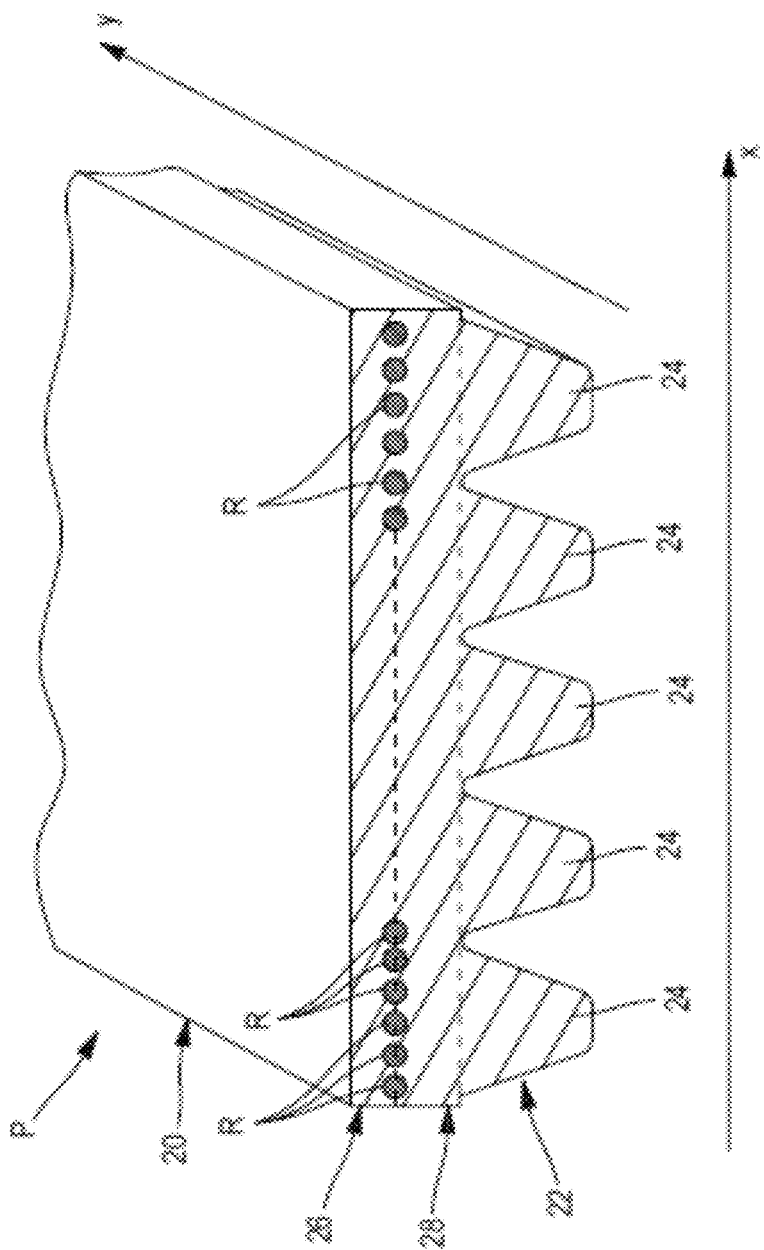
FIG. 1 is a composite according to the invention that forms a power transmission belt P.

"Meta position relative to one another" is understood to mean that the hydroxyl functions are borne by carbons of the aromatic ring which are separated from one another by a single other carbon of the aromatic ring.

"Position ortho to a function" is understood to mean the position occupied by the carbon of the aromatic ring which is immediately adjacent to the carbon of the aromatic ring bearing the function.

The expression "resin based on" should, of course, be understood as meaning a resin comprising the mixture and/or the product of the reaction between the various base constituents used for the final condensation of this resin, preferably solely the product of the reaction between the various base constituents used for this resin, it being possible for some of them to be intended to react or capable of reacting with one another or with their immediate chemical surroundings, at least partly, during the various phases of the process for manufacturing the composition or the composites, in particular during a curing step. Thus the base constituents are the reactants intended to react together during the final condensation of the resin and are not reactants intended to react together to form these base constituents.

In accordance with the invention, the base constituents therefore comprise at least one phenol compound and at least one aromatic compound. In one embodiment, the base constituents may comprise other additional constituents different from the phenol compound and from the aromatic compound. In another embodiment, the base constituents consist of at least one phenol compound and at least one aromatic compound.

Preferably, in the embodiment where the base constituents comprise other additional constituents, these other additional constituents are devoid of formaldehyde and/or devoid of methylene donor selected from the group consisting of hexamethylenetetramine (HMT), hexamethoxymethylmelamine (H3M), hexaethoxymethylmelamine, lauryloxymethylpyridinium chloride, ethoxymethylpyridinium chloride, polymers of hexamethoxymethylmelamine of trioxane of formaldehyde, hexakis(methoxymethyl)melamine, N,N',N"-trimethyl-N,N',N"-trimethylolmelamine, hexamethylolmelamine, N-methylolmelamine, N,N'-dimethylolmelamine, N,N',N"-tris(methoxymethyl)melamine, N,N', N"-tributyl-N,N',N"-trimethylolmelamine. More advantageously, these other additional constituents are devoid of formaldehyde and devoid of the methylene donors described in this paragraph.

More preferably, in the embodiment where the base constituents comprise other additional constituents, these other additional constituents are devoid of formaldehyde and/or devoid of methylene donor selected from the group consisting of hexamethylenetetramine, hexaethoxymethylmelamine, hexamethoxymethylmelamine, lauryloxymethylpyridinium chloride, ethoxymethylpyridinium chloride, hexamethoxymethylmelamine of trioxane and the N-substituted oxymethylmelamines corresponding to the general formula:

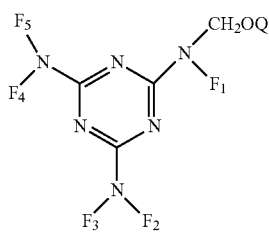

in which Q represents an alkyl group containing from 1 to 8 carbon atoms; $F_1$, $F_2$, $F_3$, $F_4$ and $F_5$ are selected, independently of one another, from the group consisting of a hydrogen atom, of an alkyl group containing from 1 to 8 carbon atoms, of the —CH2OQ group and the condensation products thereof. More advantageously, these other additional constituents are devoid of formaldehyde and devoid of the methylene donors described in this paragraph.

More preferably still, in the embodiment where the base constituents comprise other additional constituents, these other additional constituents are devoid of formaldehyde and/or devoid of methylene donor. More advantageously, these other additional constituents are devoid of formaldehyde and devoid of methylene donors.

Devoid of formaldehyde or devoid of methylene donor is understood to mean that the total content by weight of formaldehyde or of methylene donor or donors belonging to the groups described above, by total weight of the aromatic compound or compounds A1 in the base constituents, is less than or equal to 10%, preferably less than or equal to 5%, more preferentially less than or equal to 2% and more preferentially still less than or equal to 1%.

Devoid of formaldehyde or devoid of methylene donor is understood to mean that the total content by weight of formaldehyde or of methylene donor or donors belonging to the groups described above, by total weight of the aromatic compound or compounds A1 in the base constituents, is less than or equal to 10%, preferably less than or equal to 5%, more preferentially less than or equal to 2% and more preferentially still less than or equal to 1%.

In accordance with the designation "aromatic polyphenol", the aromatic ring bearing at least two hydroxyl functions in the meta position relative to one another, the two positions ortho to at least one of the hydroxyl functions being unsubstituted, is a benzene ring.

"CHO" represents the aldehyde function.

"$CH_2OH$" represents the hydroxymethyl function.

The adhesive composition thus comprises at least one (that is to say, one or more) resin; this resin being based on at least one (that is to say, one or more) aromatic polyphenol and/or at least one (that is to say, one or more) aromatic monophenol and at least one (that is to say, one or more) aromatic compound, which constituents will be described in detail below.

An elastomeric matrix is understood to mean a matrix having elastomeric behaviour.

An elastomeric bonding layer is understood to mean a layer having elastomeric behaviour that provides a physico-chemical bond between the adhesive layer and the elastomeric matrix.

Layer "directly" coating an object is understood to mean that the layer is in contact with the object without any other object, in particular another layer, being interposed between the two.

In the present description, unless expressly indicated otherwise, all the percentages (%) shown are percentages by weight. The acronym "phr" signifies parts by weight per hundred parts of elastomer.

Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

Within the context of the invention, the carbon-based products mentioned in the description may be of fossil or biobased origin. In the latter case, they may partially or completely result from biomass or be obtained from renewable starting materials resulting from biomass.

COMPOSITE ACCORDING TO THE INVENTION

Aromatic Polyphenol and/or Aromatic Monophenol

In one embodiment, the first essential constituent of the resin is an aromatic polyphenol comprising one or more aromatic ring(s). The aromatic polyphenol comprises at least one aromatic ring bearing at least two hydroxyl functions in the meta position relative to one another, the two positions ortho to at least one of the hydroxyl functions being unsubstituted.

In another embodiment, the first essential constituent of the resin is an aromatic monophenol comprising at least one six-membered aromatic ring bearing a single hydroxyl function. On this aromatic monophenol, the two positions ortho to the hydroxyl function are unsubstituted, or else at least one position ortho to and the position para to the hydroxyl function are unsubstituted.

In yet another embodiment, the first essential constituent is a mixture of the aromatic polyphenol and of the aromatic monophenol as described below.

In accordance with the invention, the aromatic polyphenol may be, in one embodiment, a single molecule comprising one or more aromatic rings, at least one of these aromatic rings, or even each aromatic ring, bearing at least one hydroxyl functions in the meta position relative to one another, the two positions ortho to at least one of the hydroxyl functions being unsubstituted. Such a single molecule does not comprise a repeat unit.

Similarly, the aromatic monophenol may be, in one embodiment, a single molecule of aromatic monophenol comprising one or more six-membered aromatic rings, at least one of these six-membered aromatic rings, or even each six-membered aromatic ring, bearing a single hydroxyl function, the two positions ortho to the hydroxyl function are unsubstituted, or else, at least one position ortho to and the position para to the hydroxyl function are unsubstituted.

Such single molecules do not comprise a repeat unit.

In accordance with the invention, the aromatic polyphenol may be, in another embodiment, a pre-condensed resin based:
- on at least one aromatic polyphenol comprising at least one aromatic ring bearing at least two hydroxyl functions in the meta position relative to one another, the two positions ortho to at least one of the hydroxyl functions being unsubstituted; and
- on at least one compound capable of reacting with said aromatic polyphenol comprising an aldehyde function and/or at least one compound capable of reacting with said aromatic polyphenol comprising at least two hydroxymethyl functions borne by an aromatic ring.

Such a pre-condensed resin based on aromatic polyphenol is in accordance with the invention and comprises, unlike the single molecule described above, a repeat unit. In this instance, the repeat unit comprises at least one aromatic ring bearing at least two hydroxyl functions in the meta position relative to one another.

In another embodiment, the aromatic polyphenol is a mixture of an aromatic polyphenol that forms a single molecule and of a pre-condensed resin based on aromatic polyphenol.

Similarly and in accordance with the invention, the aromatic monophenol may be, in another embodiment, a pre-condensed resin based:
- on at least one aromatic monophenol comprising at least one six-membered aromatic ring bearing a single hydroxyl function:
  the two positions ortho to the hydroxyl function are unsubstituted, or
  at least one position ortho to and the position para to the hydroxyl function are unsubstituted;
- on at least one compound capable of reacting with said aromatic monophenol comprising at least one aldehyde function and/or at least one compound capable of reacting with said aromatic monophenol comprising at least two hydroxymethyl functions borne by an aromatic ring.

Such a pre-condensed resin based on aromatic monophenol is in accordance with the invention and comprises, unlike the single molecule described above, a repeat unit. In this instance, the repeat unit comprises at least one six-membered aromatic ring bearing a single hydroxyl function.

In the particular embodiments that follow, the aromatic ring or rings of the aromatic polyphenol or the aromatic monophenol are described. For the sake of clarity, the "aromatic polyphenol" or the "aromatic monophenol" is described therein in its single molecule form. This aromatic polyphenol or this aromatic monophenol will then be able to be condensed and will in part define the repeat unit. The characteristics of the pre-condensed resin are described in greater detail below.

Aromatic Polyphenol

In a preferred embodiment, the aromatic ring of the aromatic polyphenol bears three hydroxyl functions in the meta position relative to one another.

The two positions ortho to each hydroxyl function are preferably unsubstituted. This is intended to mean that the two carbon atoms located on either side of (in the position ortho to) the hydroxylated carbon atom (i.e. that which bears the hydroxyl function) just bear a hydrogen atom.

Even more preferentially, the remainder of the aromatic ring of the aromatic polyphenol is unsubstituted. This is intended to mean that the other carbon atoms of the remainder of the aromatic ring (those other than the carbon atoms bearing hydroxyl functions) just bear a hydrogen atom.

In one embodiment, the aromatic polyphenol comprises several aromatic rings, at least two of these each bearing at least two hydroxyl functions in the meta position relative to one another, the two positions ortho to at least one of the hydroxyl functions of at least one aromatic ring being unsubstituted.

In a preferred embodiment, at least one of the aromatic rings of the aromatic polyphenol bears three hydroxyl functions in the meta position relative to one another.

The two positions ortho to each hydroxyl function of at least one aromatic ring are preferably unsubstituted.

Even more preferentially, the two positions ortho to each hydroxyl function of each aromatic ring are unsubstituted.

Advantageously, each aromatic ring of the aromatic polyphenol is a benzene ring.

By way of example of an aromatic polyphenol comprising a single aromatic ring, mention may in particular be made of resorcinol and phloroglucinol, as a reminder having the structural formulae:

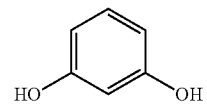

(I)

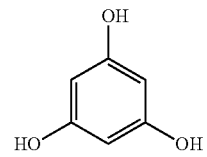

(II)

By way of examples, in the case in which the aromatic polyphenol comprises several aromatic rings, at least two of these aromatic rings, which are identical or different, are selected from those of general formulae:

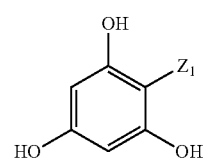

(III-a)

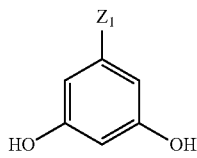
(III-b)

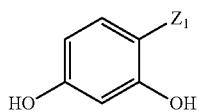
(III-c)

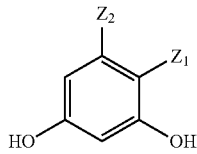
(III-d)

in which the $Z_1$ and $Z_2$ symbols, which are identical or different, if there are several of them on the same aromatic ring, represent an atom (for example, carbon, sulfur or oxygen) or a connecting group, by definition at least divalent, which connects at least these two aromatic rings to the remainder of the aromatic polyphenol.

Another example of aromatic polyphenol is 2,2',4,4'-tetrahydroxydiphenyl sulfide having the following structural formula:

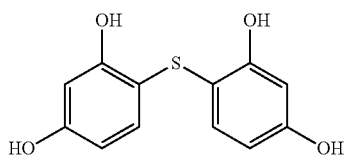
(IV)

Another example of aromatic polyphenol is 2,2',4,4'-tetrahydroxydiphenyl benzophenone having the following structural formula:

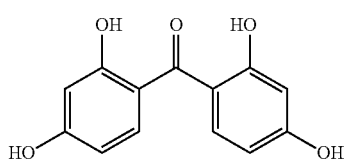
(V)

It is noted that each compound IV and V is an aromatic polyphenol comprising two aromatic rings (of formulae III-c), each of which bears at least two (in this instance two) hydroxyl functions in the meta position relative to one another.

It is noted, in the case of an aromatic polyphenol comprising at least one aromatic ring in accordance with formula III-b, that the two positions ortho to each hydroxyl function of at least one aromatic ring are unsubstituted. In the case of an aromatic polyphenol comprising several aromatic rings in accordance with formula III-b, the two positions ortho to each hydroxyl function of each aromatic ring are unsubstituted.

According to one embodiment of the invention, the aromatic polyphenol is selected from the group consisting of resorcinol (I), phloroglucinol (II), 2,2',4,4'-tetrahydroxydiphenyl sulfide (IV), 2,2',4,4'-tetrahydroxybenzophenone (V), resins pre-condensed from at least one of these aromatic polyphenols and the mixtures of these compounds. In a particularly advantageous embodiment, the aromatic polyphenol is phloroglucinol.

In one embodiment, the aromatic polyphenol comprises a pre-condensed resin based on the aromatic polyphenol as described in any one of these embodiments.

This pre-condensed resin is advantageously based:
  on at least one aromatic polyphenol as defined above, and preferentially selected from the group consisting of resorcinol, phloroglucinol, 2,2',4,4'-tetrahydroxydiphenyl sulfide, 2,2',4,4'-tetrahydroxybenzophenone and the mixtures thereof; and
  on at least one compound capable of reacting with said aromatic polyphenol comprising an aldehyde function and/or at least one compound capable of reacting with said aromatic polyphenol comprising at least two hydroxymethyl functions borne by an aromatic ring.

Advantageously, the compound capable of reacting with said aromatic polyphenol may be an aromatic compound as defined below, a compound of formula Ar-(CHO)$_2$, where Ar represents an aromatic ring, or any other aldehyde. Advantageously, said compound is selected from the group consisting of an aromatic compound comprising an aromatic ring bearing at least two functions, one of these functions being a hydroxymethyl function, the other being an aldehyde function or a hydroxymethyl function, formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. Very advantageously, when the compound is an aromatic compound comprising an aromatic ring bearing at least two functions, one of these functions being a hydroxymethyl function, the other being an aldehyde function or a hydroxymethyl function, this compound is selected from the group consisting of 5-(hydroxymethyl)furfural, 2,5-di(hydroxymethyl)furan and the mixtures of these compounds.

Thus, in the pre-condensed resin based on aromatic polyphenol, the repeat unit corresponds to the characteristics of the aromatic polyphenol defined above except that at least one of the carbon atoms of the aromatic ring, which was unsubstituted, is connected to another unit.

Irrespective of the compound other than the aromatic polyphenol at the heart of the pre-condensed resin, this pre-condensed resin is devoid of free formaldehyde. Specifically, even in the case where the pre-condensed resin is based on an aromatic polyphenol as described previously and on formaldehyde, since the formaldehyde has already reacted with the aromatic polyphenol, the pre-condensed resin is devoid of free formaldehyde liable to be able to react with the aromatic polyphenol in accordance with the invention in a subsequent step.

The aromatic polyphenol may also comprise a mixture of a free aromatic polyphenol molecule and of a pre-condensed resin based on aromatic polyphenol, as described above. In particular, the aromatic polyphenol may also comprise a mixture of phloroglucinol and of a pre-condensed resin based on phloroglucinol.

Aromatic Monophenol

The aromatic monophenol may be in accordance with two variants. In one variant, the two positions ortho to the hydroxyl function are unsubstituted. In another variant, at least one position ortho to and the position para to the hydroxyl function are unsubstituted.

Advantageously, in the variant in which at least one position ortho to and the position para to the hydroxyl function are unsubstituted, a single ortho position is unsubstituted and the position para to the hydroxyl function is unsubstituted.

Preferably, regardless of the variant, the two positions ortho to the hydroxyl function are unsubstituted. This is intended to mean that the two carbon atoms located on either side of (in the position ortho to) the hydroxylated carbon atom (i.e. that which bears the hydroxyl function) just bear a hydrogen atom.

Even more preferentially, the remainder of the aromatic ring is unsubstituted. This is intended to mean that the other carbon atoms of the remainder of the aromatic ring (those other than the carbon atoms bearing hydroxyl functions) just bear a hydrogen atom.

In one embodiment, the aromatic monophenol comprises several six-membered aromatic rings, at least two of which each bear a single hydroxyl function and, for at least one of the hydroxyl functions, the two positions ortho to the hydroxyl function are unsubstituted, or at least one position ortho to and the position para to the hydroxyl function are unsubstituted.

Preferably, the two positions ortho to each hydroxyl function of at least one six-membered aromatic ring are unsubstituted.

Even more preferentially, the two positions ortho to each hydroxyl function of each six-membered aromatic ring are unsubstituted.

Even more preferentially, the remainder of each of the aromatic rings is unsubstituted. This is intended to mean that the other carbon atoms of the remainder of each aromatic ring (those other than the carbon atoms bearing hydroxyl functions or bearing groups that attach the aromatic rings to one another) just bear a hydrogen atom.

Advantageously, the, or each, aromatic ring of the aromatic monophenol is a benzene ring.

Preferably, the aromatic monophenol is selected from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid, and the mixtures of these compounds.

In one embodiment, the aromatic monophenol comprises a pre-condensed resin based on the aromatic monophenol as described in any one of these embodiments.

This pre-condensed resin is advantageously based:
on at least one aromatic monophenol as defined above, and preferentially selected from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid, and the mixtures of these compounds; and
on at least one compound capable of reacting with said aromatic monophenol comprising at least one aldehyde function and/or at least one compound capable of reacting with said aromatic monophenol comprising at least two hydroxymethyl functions borne by an aromatic ring.

The compound capable of reacting with said aromatic monophenol may be an aromatic compound as defined below, a compound of formula Ar-(CHO)$_2$, where Ar represents an aromatic ring, or any other aldehyde. Advantageously, said compound is selected from the group consisting of an aromatic compound comprising an aromatic ring bearing at least two functions, one of these functions being a hydroxymethyl function, the other being an aldehyde function or a hydroxymethyl function, formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. Very advantageously, when the compound is an aromatic compound comprising an aromatic ring bearing at least two functions, one of these functions being a hydroxymethyl function, the other being an aldehyde function or a hydroxymethyl function, this compound is selected from the group consisting of 5-(hydroxymethyl)furfural, 2,5-di(hydroxymethyl)furan and the mixtures of these compounds.

Thus, in the pre-condensed resin based on aromatic monophenol, the repeat unit corresponds to the characteristics of the aromatic monophenol defined above except that at least one of the carbon atoms of the six-membered aromatic ring, which was unsubstituted, is connected to another unit.

Irrespective of the compound other than the aromatic monophenol at the heart of the pre-condensed resin, this pre-condensed resin is devoid of free formaldehyde. Indeed, even in the case in which the pre-condensed resin is based on an aromatic monophenol as described previously and on formaldehyde, since the formaldehyde has already reacted with the aromatic monophenol, the pre-condensed resin is devoid of free formaldehyde liable to be able to react with a compound A1 in accordance with the invention in a subsequent step.

The aromatic monophenol may also comprise a mixture of a free aromatic monophenol molecule and of a pre-condensed resin based on aromatic monophenol, as described above. In particular, the aromatic monophenol may also comprise a mixture of phenol and of a pre-condensed resin based on phenol.

Aromatic Compound

The second essential constituent of the resin is an aromatic compound comprising at least one aromatic ring bearing at least two functions, one of these functions being a hydroxymethyl function, the other being an aldehyde function or a hydroxymethyl function. Thus, in accordance with the invention, it is said aromatic ring which bears hydroxymethyl and aldehyde functions. The compound according to the invention therefore corresponds to the general formula (VI):

$$HO-CH_2-Ar-B \qquad (VI)$$

wherein Ar represents an aromatic ring and B represents CHO or CH$_2$OH.

The aromatic ring is advantageously a 5- or 6-membered ring comprising, as members, carbon atoms and optionally one or more heteroatoms, in particular nitrogen, oxygen or sulfur atoms, optionally oxidized in N-oxide or S-oxide form. In one variant, the aromatic ring comprises 0, 1 or 2 heteroatom(s). The remainder of the aromatic ring may be substituted or unsubstituted.

The aromatic ring may bear 0, 1 or 2 aldehyde functions, advantageously 0 or 1 aldehyde function.

The aromatic ring may bear 1, 2 or 3 hydroxymethyl functions, advantageously 1 or 2 hydroxymethyl functions.

In addition, the aromatic ring may also bear 0, 1 or 2 other function(s), in particular hydroxyl.

In the embodiment in which the aromatic ring is a 6-membered ring, the B and hydroxymethyl functions are advantageously in the meta or para position relative to one another.

In the embodiment in which the aromatic ring is a 5-membered ring, the ring may comprise one or more heteroatoms, in particular nitrogen, oxygen or sulfur atoms, optionally oxidized in N-oxide or S-oxide form. Advantageously, the aromatic ring comprises 1 or 2 heteroatom(s), preferably 1 heteroatom.

In this embodiment, in which the aromatic ring is a 5-membered ring, at least one of the three following conditions is met:
the aromatic ring comprises 0 or a single aldehyde function;
the aromatic ring comprises one or two hydroxymethyl functions;
aside from the aldehyde and hydroxymethyl functions, the remainder of the aromatic ring is unsubstituted.

Advantageously, these three conditions are met.

In a first case, the aromatic ring comprises
a single aldehyde function;
a single hydroxymethyl function;
aside from the aldehyde and hydroxymethyl functions, the remainder of the aromatic ring is unsubstituted.

In a second case, the aromatic ring comprises
0 aldehyde functions;
two hydroxymethyl functions;
aside from the hydroxymethyl functions, the remainder of the aromatic ring is unsubstituted.

Advantageously, the compound is of general formula (VII):

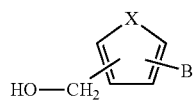
(VII)

in which B represents CHO or $CH_2OH$, X represents O, $NR_1$, NO, S, SO, $SO_2$, $SR_2R_3$, $R_1$ represents a hydrogen, an alkyl, aryl, arylalkyl, alkylaryl or cycloalkyl group, $R_2$, $R_3$ each represent, independently of one another, a hydrogen, an alkyl, aryl, arylalkyl, alkylaryl or cycloalkyl group.

Advantageously, the compound is of general formula (VII'):

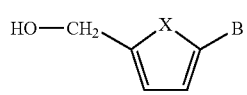
(VII')

in which X and B are as defined above.

In a particularly advantageous embodiment, B represents CHO. In another embodiment, B represents $CH_2OH$.

According to a preferential embodiment, X represents O.

In one variant, the compound is of formula (VIIa):

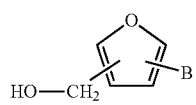
(VIIa)

B being as defined above
and more particularly of formula (VII'a1) or (VII'a2):

(VII'a1)

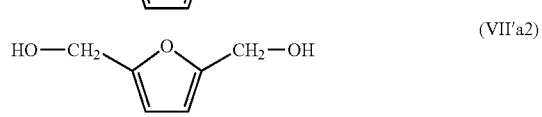
(VII'a2)

5-(Hydroxymethyl)furfural (VII'a1) is a particularly suitable aldehyde, given that this organic compound can be readily derived from renewable resources. Indeed, it is derived especially from the dehydration of certain sugars such as fructose, glucose, sucrose, cellulose and inulin.

In another embodiment, X represents $NR_1$ or NO, advantageously $NR_1$. $R_1$ is as defined above.

In one variant, the compound is of formula (VIIb):

(VIIb)

B being as defined above
and more particularly of formula (VII'b1) or (VII'b2):

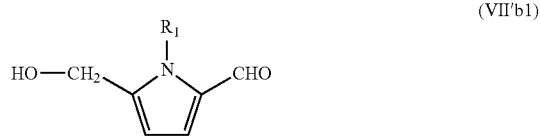
(VII'b1)

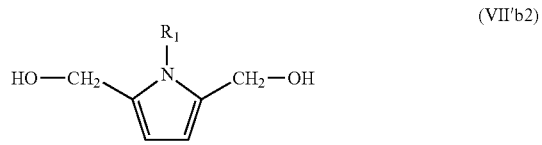
(VII'b2)

in which $R_1$ represents a hydrogen, an alkyl, aryl, arylalkyl, alkylaryl or cycloalkyl group. Advantageously, $R_1$ represents a hydrogen or a $C_1$-$C_6$ alkyl group.

In another embodiment, X represents S, SO, $SO_2$ or $SR_2R_3$.

In one variant, the compound is of formula (VIIc):
B being as defined above

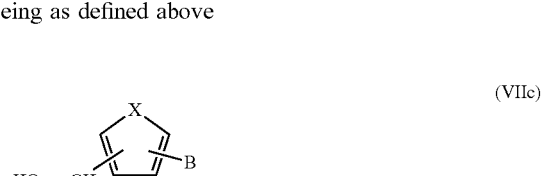
(VIIc)

where X represents S, $SR_2R_3$, SO, $SO_2$, $R_2$, $R_3$ each represent, independently of one another, a hydrogen, an alkyl, aryl, arylalkyl, alkylaryl or cycloalkyl group, B being as defined above;

and more particularly of formula (VII'c1) or (VII'c2):

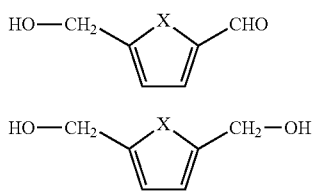

in which X represents S, SR$_2$R$_3$, SO, SO$_2$, R$_2$, R$_3$ each represent, independently of one another, a hydrogen, an alkyl, aryl, arylalkyl, alkylaryl or cycloalkyl group.

The compound may thus be:

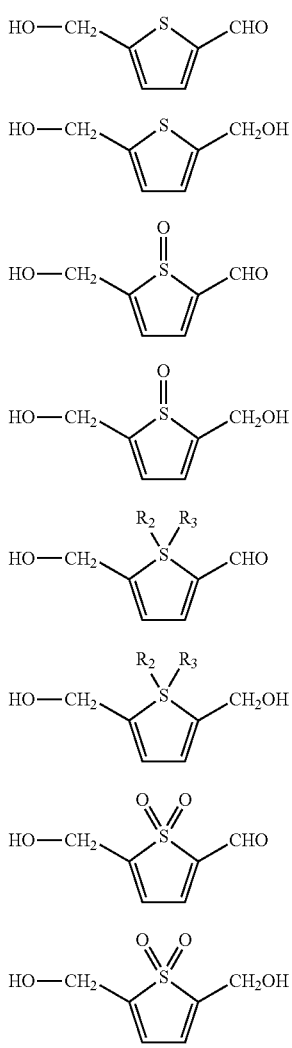

Advantageously, R$_2$ and R$_3$ each represent, independently of one another, a C$_1$-C$_6$ alkyl radical.

The compound is advantageously of formula (VII'c1) or (VII'c2).

In another variant, the aromatic ring is a 6-membered ring, possibly comprising 0, one or more heteroatoms, in particular nitrogen, optionally oxidized in N-oxide form. In one variant, the aromatic ring comprises 0, 1 or 2 heteroatom(s).

The B and hydroxymethyl functions are advantageously in the meta or para position relative to one another.

The aromatic ring may bear 0, 1 or 2 aldehyde functions, advantageously 0 or 1 aldehyde function.

The aromatic ring may bear 1, 2 or 3 hydroxymethyl functions, advantageously 1 or 2 hydroxymethyl functions.

In addition, the aromatic ring may also bear 0, 1 or 2 other function(s), in particular hydroxyl.

Advantageously, the compound is of general formula (VIII):

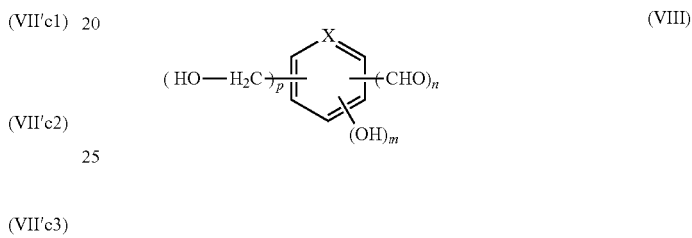

in which X represents C or NR$_1$, n is 0, 1 or 2, m is 0 or 1, p is 1, 2 or 3. R$_1$ represents a hydrogen, an alkyl, aryl, arylalkyl, alkylaryl or cycloalkyl group. In accordance with the invention, p+n>1 with p>0.

Advantageously, R$_1$ represents a hydrogen or a C$_1$-C$_6$ alkyl group.

In one variant, n is 1, m is 0 and p is 1.

In another variant, n is 1, m is 1 and p is 1.

In another variant, n is 2, m is 1 and p is 1.

In another variant, n is 1, m is 1 and p is 2.

In another variant, n is 0, m is 0 and p is 2.

In another variant, n is 0, m is 1 and p is 2.

In another variant, n is 1, m is 1 and p is 2.

In another variant, n is 0, m is 1 and p is 3.

Preferentially, the aromatic ring of the aldehyde is a benzene ring. More preferentially, this aldehyde is selected from the group consisting of 2-hydroxymethylbenzene-1-carboxaldehyde, 3-hydroxymethylbenzene-1-carboxaldehyde, 4-hydroxymethylbenzene-1-carboxaldehyde, 3-hydroxymethyl-6-hydroxybenzene-1-carboxaldehyde, 3-hydroxymethyl-4-hydroxybenzene-1-carboxaldehyde, 3-hydroxymethyl-2-hydroxybenzene-1-carboxaldehyde, 3-hydroxymethyl-2-hydroxybenzene-1,5-dicarboxaldehyde, 5-hydroxymethyl-2-hydroxybenzene-1,3-dicarboxaldehyde, 3,5-hydroxymethyl-4-hydroxybenzene-1-carboxaldehyde, 3,5-hydroxymethyl-2-hydroxybenzene-1-carboxaldehyde, 1,2-hydroxymethylbenzene, 1,3-hydroxymethylbenzene, 1,4-hydroxymethylbenzene, 1,3-hydroxymethyl-6-hydroxybenzene, 1,3-hydroxymethyl-4-hydroxybenzene, 1,3-hydroxymethyl-2-hydroxybenzene, 1,3,5-hydroxymethyl-2-hydroxybenzene, 1,3-hydroxymethyl-6-hydroxybenzene, 1,3,5-hydroxymethyl-4-hydroxybenzene, 1,3,2-hydroxymethyl-2-hydroxybenzene and the mixtures of these compounds.

Even more preferentially, the aromatic compound used is 1-hydroxymethylbenzene-4-carboxaldehyde of formula (VIIIa) or 1,4-hydroxymethylbenzene of formula (VIIIb):

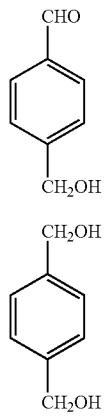

(VIIIa)

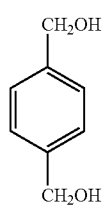

(VIIIb)

Other Preferred Compounds of the Adhesive Composition

Preferably, the adhesive composition comprises at least one unsaturated elastomer latex. It should be remembered that a latex is a stable dispersion of microparticles of elastomer(s) in suspension in an aqueous solution. Unsaturated (that is to say, bearing carbon-carbon double bonds) elastomer latices, especially diene elastomer latices, are well known to those skilled in the art.

The elastomer(s) of the latex is or are dispersed in the resin and provide(s) a good bond between the adhesive layer and the elastomeric material in which the reinforcing element is embedded. Such a latex also has the advantage of being relatively soft and flexible which makes it possible to accompany the deformations of the reinforcing element without the adhesive layer breaking. Finally, the elastomer(s) of such a latex has or have the advantage of exhibiting green tack with the elastomeric material in which the reinforcing element is embedded. Thus, during the manufacture of the composite, the reinforcing element coated with the adhesive composition adheres to the elastomeric material which does not slide around the coated reinforcing element.

The unsaturated elastomer of the latex is preferentially a diene elastomer, more preferentially a diene elastomer selected from the group consisting of polybutadienes, butadiene copolymers, polyisoprenes, isoprene copolymers, vinylpyridine-styrene-butadiene terpolymers, ethylene/alpha-olefin type elastomers, polychloroprene elastomers and the mixtures of these elastomers. Advantageously, the ethylene/alpha-olefin type elastomer is selected from the group consisting of ethylene-propylene copolymers (EPM), ethylene-propylene-diene copolymers (EPDM), and the mixtures of these copolymers.

The aqueous adhesive composition in accordance with the invention may of course comprise all or some of the additives customary for aqueous adhesive compositions, such as those used in conventional RFL adhesives; mention will be made, for example, of bases such as aqueous ammonia, sodium, potassium or ammonium hydroxide, dyes, fillers such as carbon black or silica, antioxidants or other stabilizers, and thickeners, for example carboxymethyl cellulose, or gelling agents, for example a gelatin, making it possible to increase the viscosity of the composition. Mention will also be made of additives that make it possible to modify the setting or gelling time and the open time of the resin. As is known to those skilled in the art, the setting or gelling time is the length of time for which it is possible to apply the resin to its substrate and the open time is the length of time for which, after application of the resin to its substrate, it is possible to leave the resin in the open air without adversely affecting the quality of the subsequent adhesive bond with the complementary substrate. The setting time or gelling time and the open time are especially dependent on the temperature, pressure or else the resin concentration.

Process for Manufacturing the Adhesive Composition $N1$ is defined as the number of reactive sites on the aromatic compound, as follows: an aldehyde function represents two reactive sites and a hydroxymethyl function represents one reactive site. Thus, for example, 5-(hydroxymethyl)furfural has $N1=3$ reactive sites and 2,5-di(hydroxymethyl)furan has $N1=2$ reactive sites.

In the case of an aromatic polyphenol, $N2$ is defined as the number of reactive sites of the aromatic polyphenol, as follows: each free carbon on the aromatic ring adjacent to a hydroxyl function borne by the aromatic ring represents a reactive site, each free carbon only being able to be counted as a reactive site for a single adjacent hydroxyl function. Thus, for example, resorcinol and phloroglucinol each have $N2=3$ reactive sites and 2,2',4,4'-tetrahydroxydiphenyl sulfide has $N2=4$ reactive sites.

In the case of an aromatic monophenol, $N'2$ is defined as the number of reactive sites of the aromatic monophenol, as follows: each free carbon of the six-membered aromatic ring adjacent to the hydroxyl function borne by the aromatic ring represents a reactive site, and the free carbon of the six-membered aromatic ring positioned para to the hydroxyl function represents a reactive site. Thus, for example, phenol has $N'2=3$ reactive sites.

Typically, during a first resinification step, the constituents of the resin itself are mixed, advantageously in water.

This first resinification step may be carried out according to several embodiments.

Before describing in detail the various embodiments, it will firstly be specified that the resin of the aqueous adhesive composition may be obtained by mixing the constituents of the resin, i.e. the aromatic polyphenol as described above and/or the aromatic monophenol as defined above and the aromatic compound as defined above in a solvent that is either basic, preferably having a pH of between 8 and 13, more preferentially between 9 and 12, or that is acidic or neutral, preferably having a pH of between 4 and 7, more preferentially between 5 and 7. This solvent is advantageously water rendered basic by addition of a base or rendered acidic by addition of an acid.

In a first embodiment, use is made of a pre-condensed resin based on aromatic polyphenol as defined above, that is to say based:

on at least one aromatic polyphenol comprising at least one aromatic ring bearing at least two hydroxyl functions in the meta position relative to one another, the two positions ortho to at least one of the hydroxyl functions being unsubstituted; and on at least one compound capable of reacting with said aromatic polyphenol comprising at least one aldehyde function and/or at least one compound capable of reacting with said aromatic polyphenol comprising at least two hydroxymethyl functions borne by an aromatic ring.

The pre-condensed resin based on aromatic polyphenol is advantageously prepared by gradually mixing the aromatic polyphenol and the compound comprising at least one aldehyde function and/or the compound comprising at least two hydroxymethyl functions borne by an aromatic ring, for example formaldehyde, in molar amounts as described above.

In a first variant, the components on which the pre-condensed resin is based are mixed in a basic solvent, such as an aqueous sodium hydroxide solution, preferably having a pH of between 8 and 13, more preferentially between 9 and 12.

Thus, the pre-condensed resin is obtained by mixing:
said aromatic polyphenol, and
said compound capable of reacting with said aromatic polyphenol,
in a basic solvent preferably having a pH of between 8 and 13, more preferentially between 9 and 12.

In a second variant, the components on which the pre-condensed resin is based are mixed in an acidic or neutral solvent such as an aqueous solution having a pH of between 4 and 7, preferably between 5 and 7.

Thus, the pre-condensed resin is obtained by mixing:
said aromatic polyphenol, and
said compound capable of reacting with said aromatic polyphenol,
in an acidic or neutral solvent preferably having a pH of between 4 and 7, more preferentially between 5 and 7.

In some cases, for example at relatively high concentrations or in the case of an acidic solvent, those skilled in the art may find cause to add a thickener, for example carboxymethyl cellulose, or a gelling agent, for example a gelatin, in order to limit sedimentation of the pre-condensed resin.

Regardless of the variant, the combined constituents are mixed with stirring for a time which may vary depending on the temperature used and the specific composition targeted, for example for a period of time which may vary between 1 min and 6 h, at a temperature of between 20° C. and 90° C., preferentially between 20° C. and 60° C.

As described above, it is advantageously possible to neutralize the medium so as to obtain a pre-condensed resin that can be stored and used subsequently.

In order to prepare the pre-condensed resin, the molar amount n2 of aromatic polyphenol A2 and the molar amount n1 of the aromatic compound A1 are such that $[(n2*N2)+(n'2N'2)]/(n1*N1)>1$, preferably $1<[(n2*N2)+)+(n'2N'2)]/(n1*N1)<5$.

Then, in this first embodiment, the adhesive composition may be obtained by mixing:
this pre-condensed resin and
the aromatic compound,
in a basic solvent preferably having a pH of between 8 and 13, more preferentially between 9 and 12 or in an acidic or neutral solvent preferably having a pH of between 4 and 7, more preferentially between 5 and 7.

In particular, this pre-condensed resin based on aromatic polyphenol and the aromatic compound are mixed gradually in a basic solvent such as an aqueous sodium hydroxide solution, preferably having a pH of between 8 and 13, more preferentially between 9 and 12, or else in an acidic or neutral solvent such as an aqueous solution having a pH of between 4 and 7, preferably between 5 and 7. Regardless of whether it is in acidic or basic medium, all the constituents are mixed with stirring for a length of time which may vary depending on the temperature used and the specific composition targeted, for example for a duration which may vary between 1 min and 6 h, at a temperature of between 20° C. and 90° C., preferentially between 20° C. and 60° C. Those skilled in the art will know how to adjust the molar amounts of the pre-condensed resin based on aromatic polyphenol and of the aromatic compound in order to obtain crosslinking and a concentration suitable for the desired use, especially as a function of the nature of the pre-condensed resin based on aromatic polyphenol.

In a second embodiment, use is made of a pre-condensed resin as described above, that is to say based:
on at least one aromatic compound bearing at least two functions, one of these functions being a hydroxymethyl function, the other being an aldehyde function or a hydroxymethyl function, the aromatic compound comprises at least one aromatic ring, for example 5-(hydroxymethyl)furfural, and
on at least one aromatic polyphenol comprising at least one aromatic ring bearing at least two hydroxyl functions in the meta position relative to one another, the two positions ortho to at least one of the hydroxyl functions being unsubstituted, for example phloroglucinol.

In this second embodiment, the pre-condensed resin based on aromatic polyphenol is prepared under conditions analogous to the pre-condensed resin based on aromatic polyphenol of the first embodiment. Next, this pre-condensed resin based on aromatic polyphenol and the aromatic compound are gradually mixed under conditions analogous to those of the first embodiment. Here too, those skilled in the art will know how to adjust the molar amounts of pre-condensed resin based on aromatic polyphenol and of the aromatic compound in order to obtain crosslinking and a concentration suitable for the desired use, especially as a function of the nature of the pre-condensed resin based on aromatic polyphenol.

In a third embodiment, use is made of an aromatic polyphenol in the form of a single molecule, for example phloroglucinol.

In a first variant, the resin is obtained by:
mixing the aromatic polyphenol in the form of a single molecule in a basic solvent preferably having a pH of between 8 and 13, more preferentially between 9 and 12 or in an acidic or neutral solvent preferably having a pH of between 4 and 7, more preferentially between 5 and 7,
then addition of the aromatic compound.

In particular, the aromatic polyphenol is firstly mixed in a basic solvent such as an aqueous sodium hydroxide solution, preferably having a pH of between 8 and 13, more preferentially between 9 and 12, or else in an acidic or neutral solvent such as an aqueous solution having a pH of between 4 and 7, preferably between 5 and 7.

In some cases, for example at relatively high concentrations or in the case of an acidic solvent, those skilled in the art may find cause to add a thickener, for example carboxymethyl cellulose, or a gelling agent, for example a gelatin, in order to limit sedimentation of the aromatic polyphenol.

Next, the aromatic compound is added. In particular, the aromatic compound is gradually added under conditions analogous to those of the first embodiment.

In a second variant, the resin is obtained by:
mixing the aromatic compound in a basic solvent preferably having a pH of between 8 and 13, more preferentially between 9 and 12, or in an acidic or neutral solvent preferably having a pH of between 4 and 7, more preferentially between 5 and 7,
then adding the aromatic polyphenol in the form of a single molecule.

In particular, the aromatic compound is firstly mixed in an aqueous solution, preferably in a basic solvent, such as an aqueous sodium hydroxide solution, preferably having a pH of between 8 and 13, more preferentially between 9 and 12. Then, the aromatic polyphenol is added and the components are mixed under conditions analogous to those of the first embodiment.

A molar amount n2 of aromatic polyphenol and a molar amount n1 of the aromatic compound are mixed such that $0.3 \leq (n2*N2)/(n1*N1) \leq 3$, and preferably $1 < (n2*N2)/(n1*N1) \leq 2$.

In each of the three preceding embodiments, the aromatic polyphenol could be entirely or partially replaced by an aromatic monophenol comprising at least one six-membered aromatic ring bearing a single hydroxyl function, the two positions ortho to the hydroxyl function being unsubstituted, or at least one position ortho to and the position para to the hydroxyl function being unsubstituted.

In this case, in the third embodiment described above, in which use is made of compounds in the form of single molecules, a molar amount n2 of aromatic polyphenol A2 and/or a molar amount n'2 of aromatic monophenol A2' and a molar amount n1 of the aromatic compound A1 would then be mixed such that $0.3 \leq [(n2*N2)+(n'2*N'2)]/(n1*N1) \leq 3$, and preferably $1 < [(n2*N2)+(n'2*N'2)]/(n1*N1) \leq 2$.

In any one of these three embodiments, the partially crosslinked resin is generally diluted in water before being added to the unsaturated elastomer latex or latices (if there are several), in order to form the aqueous adhesive composition of the invention, according to a general procedure which is well known to those skilled in the art in the field of RFL adhesives.

Preferably, during this step of forming the aqueous adhesive composition, it will be ensured that the aqueous adhesive composition has a pH of between 8 and 13, more preferentially between 9 and 12, so as to limit any potential precipitation of the, or of some, unsaturated elastomer latex (latices).

Thus, in the event that, during the resinification step preceding this step of forming the aqueous adhesive composition, use was made of an acidic or neutral solvent or a basic solvent which was neutralized, a base will be added that makes it possible to obtain a pH of between 8 and 13, more preferentially between 9 and 12, prior to the addition of the unsaturated elastomer latex (latices), so as to limit any potential precipitation of the, or of some, unsaturated elastomer latex (latices).

For example, the constituents of the adhesive composition are added in the following order: the water, possible water-soluble additives (for example aqueous ammonia), the latex or latices (any order) and the partially crosslinked resin (diluted). The combination is mixed with stirring for 1 to 30 min, for example at 20° C.

During a final manufacturing step, referred to as maturation step, the aqueous adhesive composition is generally stored at ambient temperature (23° C.) for a maturation time which can typically vary from 1 to several hours, indeed even several days, before it is finally used.

In the final adhesive composition thus prepared, the solids content of resin preferably represents between 5% and 60% by weight, more preferentially between 10% and 30% by weight, of the adhesive composition solids.

This solids content is measured in accordance with standard NF EN 827 (March 2006).

The content of unsaturated elastomer (that is to say, the solids of the latex or latices) is itself preferably between 40% and 95%, more preferentially between 70% and 90% by weight of the solids of the adhesive composition.

The weight ratio of polyphenol and/or monophenol to aromatic compound is preferentially between 0.1 and 3, more preferentially between 0.25 and 2.

The weight ratio of resin solids to latex solids is preferably between 0.1 and 2.0, more preferentially between 0.15 and 1.0.

The water content of the adhesive composition is preferably between 60% and 90%, more preferentially between 60% and 85%.

Advantageously, in particular in the case of a metallic reinforcing element, the adhesive composition comprises a gelatin. The gelatin makes it possible to slow down the dewetting of the reinforcing elements and thus to ensure better adhesion between the reinforcing element and the elastomeric material. "Gelatin" is understood to mean any mixture of proteins comprising products from the total or partial hydrolysis of collagen.

Elastomeric Matrix

The elastomeric matrix in which the reinforcing element (s) is or are embedded may comprise, in addition to an elastomer selected from the group consisting of an ethylene/alpha-olefin type elastomer, a polychloroprene elastomer, and the mixtures of these elastomers, one or more other elastomers. The elastomeric matrix may also comprise one or more other components.

In one preferred embodiment, the elastomeric matrix comprises an ethylene/alpha-olefin type elastomer. Preferably, in this embodiment, the elastomeric matrix comprises at least 50 phr of the ethylene/alpha-olefin type elastomer and more preferentially at least 60 phr of the ethylene/alpha-olefin type elastomer.

Advantageously, the ethylene/alpha-olefin type elastomer is selected from the group consisting of ethylene-propylene copolymers (EPM), ethylene-propylene-diene copolymers (EPDM), and the mixtures of these copolymers.

In one preferred embodiment, the elastomeric matrix comprises a polychloroprene elastomer. Preferably, in this embodiment, the elastomeric matrix comprises at least 50 phr of the polychloroprene elastomer and more preferentially at least 60 phr of the polychloroprene elastomer.

In one embodiment, the elastomeric matrix comprises a reinforcing filler.

When a reinforcing filler is used, use may be made of any type of reinforcing filler known for its abilities to reinforce an elastomeric matrix, for example an organic filler such as carbon black, a reinforcing inorganic filler such as silica, or else a blend of these two types of filler, especially a blend of carbon black and silica.

All the carbon blacks conventionally used in elastomeric matrices are suitable as carbon blacks.

"Reinforcing inorganic filler" should be understood, in the present application, by definition, as meaning any inorganic or mineral filler, regardless of its colour and its origin (natural or synthetic), also referred to as "white filler", "clear filler" or even "non-black filler", in contrast to carbon black, capable of reinforcing by itself alone, without means other than an intermediate coupling agent, an elastomeric matrix, in other words capable of replacing, in its reinforcing role, a conventional carbon black. Such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, a reinforcing inorganic filler is also understood to mean mixtures of various reinforcing inorganic fillers.

Mineral fillers of the siliceous type, especially silica ($SiO_2$), or of the aluminous type, especially alumina ($Al_2O_3$), are suitable in particular as reinforcing inorganic fillers.

Finally, those skilled in the art will understand that, as filler equivalent to the reinforcing inorganic filler described in the present section, use might be made of a reinforcing filler of another, especially organic, nature, provided that this reinforcing filler is covered with an inorganic layer, such as silica, or else comprises functional sites, especially hydroxyl sites, at its surface which require the use of a coupling agent in order to establish the bond between the filler and the elastomer.

Preferably, the content of total reinforcing filler (carbon black and/or reinforcing inorganic filler) is in a range from 10 to 100 phr.

The carbon black can advantageously constitute the sole reinforcing filler or the predominant reinforcing filler. Of course, it is possible to use just one carbon black or a blend of several carbon blacks of different grades. The carbon black can also be used as a blend with other reinforcing fillers and in particular reinforcing inorganic fillers as described above, and in particular silica.

Preferentially, the elastomeric matrix comprises an $\alpha$, $\beta$-unsaturated organic acid metal salt. Advantageously, the content of $\alpha$, $\beta$-unsaturated organic acid metal salt ranges from 2 to 50 phr, and preferably from 15 to 25 phr.

In one preferred embodiment, the $\alpha$, $\beta$-unsaturated organic acid metal salt is zinc methacrylate, in particular zinc monomethacrylate.

Preferably, the elastomeric matrix comprises various additives.

The rubber compositions may also comprise all or some of the standard additives customarily used in the elastomeric materials, such as for example plasticizers or extending oils, whether the latter are aromatic or non-aromatic in nature, protective agents, such as antiozone waxes, chemical antiozonants, antioxidants, antifatigue agents or else adhesion promoters, such as for example those disclosed in EP 0 964 030.

Preferably, the elastomeric matrix comprises a crosslinking system.

The crosslinking system advantageously comprises a peroxide, preferably an organic peroxide. Advantageously, the peroxide content ranges from 0.5 to 8 phr.

In certain embodiments, the crosslinking system comprises a co-crosslinking agent, preferably sulfur or triallyl cyanurate. Advantageously, the content of the co-crosslinking agent ranges from 0.5 to 5 phr.

Reinforcing Element

In one embodiment, the reinforcing element is metallic.

Advantageously, the reinforcing element is a threadlike reinforcing element. The term "threadlike reinforcing element" is understood to mean the elongate elements of great length relative to their cross section, whatever the shape, for example circular, oblong, rectangular or square, or even flat, of the latter, it being possible for this threadlike element to be straight or not straight, for example twisted or wavy. When it is circular in shape, the diameter of each threadlike reinforcing element is preferably less than 5 mm, more preferably within a range extending from 0.1 to 0.5 mm. Mention will also be made of the strips or bands which exhibit a great length with respect to their thickness.

The reinforcing element can comprise, in one embodiment, a single elementary metallic monofilament. In another embodiment, the reinforcing element comprises several elementary metallic monofilaments assembled together, for example by braiding or twisting. Mention will be made, among the reinforcing elements comprising several elementary metallic monofilaments, for example, of layered cords and multistrand ropes. Each threadlike elementary metallic monofilament is unitary, that is to say that the constituents of each elementary metallic monofilament are inseparable from one another.

Advantageously, the metallic reinforcing element comprises one or more elementary metallic monofilaments each comprising a steel core. The steel core is monolithic, that is to say that it is, for example, made as one piece or moulded.

In one embodiment, the adhesive layer directly coats the steel core of the or each elementary metallic monofilament. The adhesive layer coats at least a portion of the or each elementary metallic monofilament. Thus, the adhesive layer can partially or completely coat the or each elementary metallic monofilament. Thus, in the embodiment in which the reinforcing element comprises a single elementary metallic monofilament, the adhesive layer can coat some portions of this monofilament or else the whole of it. In the embodiment in which the reinforcing element comprises several elementary metallic monofilaments, the adhesive layer can coat several elementary metallic monofilaments without coating others of them, or else can coat solely certain portions of some or all of the elementary metallic monofilaments.

The steel may have a pearlitic, ferritic, austenitic, bainitic or martensitic microstructure or a microstructure resulting from a mixture of these microstructures.

Preferably, the steel comprises a carbon content ranging from 0.2% to 1% by weight and more preferably from 0.3% to 0.7% by weight.

In one embodiment, the steel used comprises less than 0.5%, preferably at most 0.05%, limit included, and more preferentially at most 0.02%, limit included, by weight of chromium.

In another embodiment using "stainless" steel, the steel comprises at least 0.5%, limit included, preferably at least 5%, limit included, and more preferentially at least 15%, limit included, by weight of chromium.

In another embodiment, the adhesive layer directly coats a layer of a metallic coating directly coating the steel core of the or each elementary metallic monofilament. The metal of the layer of the metallic coating is made from a metal other than steel.

Preferably, the metal of the layer of the metallic coating directly coating at least a portion of the steel core of the or each elementary metallic monofilament is selected from zinc, copper, tin and the alloys of these metals. Mention will be made, as examples of alloys of these metals, of brass and bronze.

In yet another embodiment, the adhesive layer directly coats a nonmetallic intermediate adhesive layer coating the steel core of the or each elementary metallic monofilament. In a variant of this embodiment, the nonmetallic intermediate adhesive layer directly coats the layer of the metallic coating directly coating the steel core of the or each threadlike reinforcing element. The nonmetallic intermediate layer, generally known as adhesion primer, makes it possible, in combination with the adhesive layer comprising the adhesive composition, to improve the adhesion of the reinforcing element to the elastomeric matrix. Such adhesion primers are those commonly used by a person skilled in the art for the presizing of certain textile fibres (in particular polyester, for example PET, aramid or aramid/nylon fibres). For example, use could be made of an epoxy-based primer, in particular a primer based on polyglycerol polyglycidyl ether. Use could also be made of a primer based on blocked isocyanate.

Layer "directly" coating an object is understood to mean that the layer is in contact with the object without any other object, in particular another layer, being interposed between the two.

In another embodiment, the reinforcing element is nonmetallic.

The reinforcing element may thus be a threadlike element such as a monofilament, a multifilament ply of several elementary monofilaments, an assembly of several multifilament plies, a film, or also a fabric produced from one or more of these elements, for example a woven fabric, a twill fabric or a knit fabric.

Advantageously, the nonmetallic reinforcing element is a threadlike element. The term "threadlike" is generally understood to mean any elongate element of great length relative to its cross section, regardless of the shape, for example circular, oblong, rectangular, square, or even flat, of this cross section, it being possible for this threadlike element to be straight or not straight, for example twisted or wavy. The largest dimension of its cross section is preferentially less than 5 mm, more preferentially less than 3 mm. This threadlike element may take any known shape, it may for example be an elementary monofilament of large diameter (for example and preferably equal to or greater than 50 µm), a multifilament ply (consisting of a plurality of elementary filaments of small diameter, typically less than 30 µm), a folded yarn or cord formed from several multifilament plies or monofilament plies twisted or braided together, or else an assembly, a group or row of monofilaments or threadlike elements such as, for example, a band or strip comprising several of these monofilaments, multifilament plies or monofilament plies grouped together, for example aligned along a main direction, whether straight or not. Such threadlike elements may also be films. The term "film" is generally understood to mean an elongate element of great length relative to its cross section, the cross section of which has an aspect ratio (width to thickness) of greater than 5, preferably of greater than 10, and the width of which is preferentially at least equal to 3 mm, more preferentially at least equal to 5 mm.

Preferably, the nonmetallic reinforcing element comprises at least one multifilament ply of elementary monofilaments. Preferentially, the nonmetallic reinforcing element comprises several multifilament plies of elementary monofilaments, these multifilament plies being wound in a helix around one another.

Preferentially, the nonmetallic reinforcing element is made from a material selected from the group consisting of textile materials, mineral materials and the combinations of these materials.

In the present application, by definition, "textile" is understood to mean, as is well known to those skilled in the art, any material made of a natural or synthetic substance, which is capable of being transformed into a monofilament, fibre or film by any appropriate transformation process. Mention may be made, for example, without the examples below being limiting, of a polymer spinning process, such as, for example, melt spinning, solution spinning or gel spinning.

In a variant, the nonmetallic reinforcing element is made from a textile material, preferably selected from the group consisting of polyesters, polyamides, polyketones, polyvinyl alcohols, celluloses and combinations of these materials.

Mention may be made, among polyesters, for example, of PET (polyethylene terephthalate), PEN (polyethylene naphthalate), PBT (polybutylene terephthalate), PBN (polybutylene naphthalate), PPT (polypropylene terephthalate) or PPN (polypropylene naphthalate).

Mention may be made, among polyamides, of aliphatic polyamides such as polyamides 4-6, 6, 6-6 (nylon), 11 or 12 and aromatic polyamides such as aramid.

Mention may be made, among celluloses, of natural or artificial cellulose, such as cotton, rayon, linen, hemp.

More preferentially, the nonmetallic reinforcing element is made from a textile material selected from the group consisting of polyesters, aliphatic polyamides and aromatic polyamides and combinations of these materials.

In another variant, the nonmetallic reinforcing element is made from a mineral material selected from the group consisting of glass fibres, carbon fibres and the combinations of these materials.

In one embodiment, the elastomeric body directly coats the adhesive layer. A body that "directly" coats an object is understood to mean that the body is in contact with the object without any other object, in particular another layer, being interposed between the two.

In another embodiment, the composite comprises an elastomeric bonding layer made from an elastomeric bonding composition and directly coating the adhesive layer, the elastomeric bonding composition comprising at least one elastomer selected from the group consisting of an ethylene/alpha-olefin type elastomer, a polychloroprene elastomer (CR), and the mixtures of these elastomers. In this embodiment, the elastomeric body thus directly coats the elastomeric bonding layer.

Advantageously, the ethylene/alpha-olefin type elastomer is selected from the group consisting of ethylene-propylene copolymers (EPM), ethylene-propylene-diene copolymers (EPDM), and the mixtures of these copolymers.

In one preferred embodiment, the elastomer(s) of the elastomeric bonding composition is or are identical to the elastomer(s) of the elastomer matrix.

Preferably, the elastomeric bonding layer forms a sheath around the reinforcing element. Such a sheath makes it possible to ensure a mechanical clamping of the elastomeric bonding layer against the reinforcing element coated with the adhesive layer.

In one embodiment, the adhesive layer directly coats the nonmetallic reinforcing element.

In another embodiment, the adhesive layer directly coats a cohesion composition impregnating the nonmetallic reinforcing element. The reinforcing elements thus impregnated are then subjected to the coating by the adhesive composition. Preferably, the cohesion composition is based on a reaction product of an isocyanate. Such a reaction product is for example a uretidinedione, an isocyanurate or a mixture of these two compounds.

Layer "directly" coating an object is understood to mean that the layer is in contact with the object without any other object, in particular another layer, being interposed between the two.

In one particularly preferred embodiment, the composite forms a power transmission belt.

Advantageously, the power transmission belts comprises a mechanical drive layer arranged in contact with the elastomeric body, the mechanical drive layer being provided with ribs.

Preferably, the drive layer is made from an elastomeric composition comprising at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers.

Advantageously, the elastomer of the elastomeric composition of the drive layer is selected from the group consisting of an ethylene/alpha-olefin type elastomer, a polychloroprene elastomer (CR), a polybutadiene (BR), a natural rubber (NR), a butadiene-styrene copolymer (SBR) and the mixtures of these elastomers.

More preferentially, the ethylene/alpha-olefin type elastomer is selected from the group consisting of ethylene-propylene copolymers (EPM), ethylene-propylene-diene copolymers (EPDM), and the mixtures of these copolymers.

Process for Manufacturing the Composite and a Power Transmission Belt

Another subject of the invention is a process for manufacturing a composite, comprising the following steps:

1) arranging, in the uncured state, a stack comprising, in this order:
  a first elastomeric layer made from a first elastomeric material,
  at least one reinforcing element coated with an adhesive layer made from an adhesive composition, the adhesive composition comprising at least one resin based:
    on at least one aromatic polyphenol comprising at least one aromatic ring bearing at least two hydroxyl functions in the meta position relative to one another, the two positions ortho to at least one of the hydroxyl functions being unsubstituted, and/or
    on at least one aromatic monophenol comprising at least one six-membered aromatic ring bearing a single hydroxyl function,
      the two positions ortho to the hydroxyl function being unsubstituted, or
      at least one position ortho to and the position para to the hydroxyl function being unsubstituted, and
    on at least one aromatic compound comprising at least one aromatic ring bearing at least two functions, one of these functions being a hydroxymethyl function and the other being an aldehyde function or a hydroxymethyl function,
  a second elastomeric layer made from a second elastomeric material, at least one of the first and second elastomeric materials comprising at least one elastomer selected from the group consisting of an ethylene/alpha-olefin type elastomer, a polychloroprene elastomer (CR), and the mixtures of these elastomers,
2) moulding and crosslinking the stack.

Preferably, the ethylene/alpha-olefin type elastomer of at least one of the first and second elastomeric materials is selected from the group consisting of ethylene/propylene copolymers (EPM), ethylene/propylene/diene copolymers (EPDM), and the mixtures of these copolymers.

In one preferred embodiment, the process comprises, prior to the step of arranging the stack, a step of impregnating the reinforcing element with a cohesion composition.

Advantageously, the process comprises, prior to the step of arranging the stack, a step of coating the reinforcing element with the adhesive composition, it being possible for this coating step to advantageously be carried out after the impregnating step described above.

In one embodiment, each first and second elastomeric layer is arranged directly in contact with the adhesive layer.

In another embodiment, the process comprises, prior to the step of arranging the stack, a step of coating the adhesive layer directly with the elastomeric bonding composition, this step implicitly being carried out after the step of coating the reinforcing element with the adhesive composition. The elastomeric bonding composition then comprising at least one elastomer selected from the group consisting of an ethylene/alpha-olefin type elastomer, a polychloroprene elastomer (CR) and the mixtures of these elastomers.

Advantageously, the ethylene/alpha-olefin type elastomer of the elastomeric bonding composition is selected from the group consisting of ethylene-propylene copolymers (EPM), ethylene-propylene-diene copolymers (EPDM), and the mixtures of these copolymers.

The step of coating the adhesive composition on the reinforcing element may be carried out according to any suitable method, especially by any known coating technique, such as, for example, spraying, impregnation by dipping, travelling through a bath or other equivalent technique for depositing a thin or ultra-thin film of adhesive, or else by a combination of one or more of these techniques.

The solids weight of the aqueous adhesive composition deposited on one kilogram of the reinforcing element is preferably between 5 and 100 g, more preferentially between 30 and 70 g, more preferentially still between 40 and 60 g.

In one of the embodiments, prior to the step of coating the reinforcing element with the adhesive composition, the reinforcing element is impregnated with a cohesion composition.

After the step described above of coating the adhesive composition, the coated reinforcing element is subjected to a first heat treatment, targeted at removing any solvent or water, at a temperature of preferably between 110° C. and 260° C., more preferentially between 130° C. and 250° C., for example by passing through a tunnel oven, typically with a length of several metres, such as those commonly used for heat treatment after sizing of textile reinforcing elements coated with an RFL adhesive.

The anhydrous material thus obtained is then subjected to a second heat treatment in order to terminate the crosslinking of the adhesive composition, preferentially carried out in air in a tunnel oven as described above. The treatment temperature is preferably between 150° C. and 350° C. The treatment times are from a few seconds to a few minutes, according to the circumstances (for example, between 10 s and 10 min).

Where appropriate, those skilled in the art will know how to adjust the temperature and the duration of the heat treatment above according to the particular operating conditions of the invention, especially according to the exact nature of the reinforcing element, in particular depending on whether the treatment is carried out on monofilaments, multifilament plies, assemblies of multifilament plies or films. In particular, those skilled in the art will have the advantage of scanning the treatment temperatures and times so as to search, by successive approximations, for the operating conditions leading to the best adhesion results, for each specific embodiment of the invention.

In the embodiment comprising a step of coating the adhesive layer with a bonding layer, this step of direct coating of the adhesive layer with the elastomeric bonding composition may be carried out by any known coating technique, such as for example impregnation by dipping, impregnation by brushing, cementation or else by a combination of one or more of these techniques. Very preferentially, the adhesive layer is directly coated with the elastomeric bonding composition by extruding a sheath of the elastomeric bonding composition around the reinforcing element coated with the adhesive layer layer. Extruding the sheath around the adhesive layer makes it possible to ensure a good cohesion between the sheath and the adhesive composition, improving the endurance of the final composite.

In one particular embodiment, during the step of arranging the stack, a third elastomeric layer made from a third elastomer material is stacked, after the second elastomeric layer.

Advantageously, the third elastomer material is made from an elastomeric composition comprising at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers.

Preferably, the elastomer of the elastomeric composition of the third elastomeric material is selected from the group consisting of an ethylene/alpha-olefin type elastomer, a polychloroprene elastomer (CR), a polybutadiene (BR), a natural rubber (NR), a butadiene-styrene copolymer (SBR) and the mixtures of these elastomers.

More preferentially, the ethylene/alpha-olefin type elastomer is selected from the group consisting of ethylene-propylene copolymers (EPM), ethylene-propylene-diene copolymers (EPDM), and the mixtures of these copolymers.

Another subject of the invention is a process for manufacturing a power transmission belt comprising the following steps:

1) arranging, in the uncured state, a stack comprising, in this order:
   a first elastomeric layer made from a first elastomeric material,
   at least one reinforcing element coated with an adhesive layer made from an adhesive composition, the adhesive composition comprising at least one resin based:
      on at least one aromatic polyphenol comprising at least one aromatic ring bearing at least two hydroxyl functions in the meta position relative to one another, the two positions ortho to at least one of the hydroxyl functions being unsubstituted, and/or
      on at least one aromatic monophenol comprising at least one six-membered aromatic ring bearing a single hydroxyl function,
         the two positions ortho to the hydroxyl function being unsubstituted, or
         at least one position ortho to and the position para to the hydroxyl function being unsubstituted, and
      on at least one aromatic compound comprising at least one aromatic ring bearing at least two functions, one of these functions being a hydroxymethyl function and the other being an aldehyde function or a hydroxymethyl function,
   a second elastomeric layer made from a second elastomeric material, at least one of the first and second elastomeric materials comprising at least one elastomer selected from the group consisting of an ethylene/alpha-olefin type elastomer, a polychloroprene elastomer, and the mixtures of these elastomers,
   a third elastomeric mechanical drive layer arranged in contact with the second elastomeric layer and made from a third elastomeric material, 2) moulding and crosslinking the stack.

The features described above apply both to the process for manufacturing the composite and to the process for manufacturing the transmission belt.

Preferably, the stack is moulded and crosslinked so as to make mechanical drive ribs in the third layer.

EXEMPLARY EMBODIMENTS OF THE INVENTION

Represented in FIG. 1 is a composite according to the invention that forms a power transmission belt P. The power transmission belt P is intended for driving any member in rotation. The power transmission belt P comprises an elastomeric body 20 made from an elastomeric matrix and in which the coated reinforcing elements R are embedded. The power transmission belt P also comprises a mechanical drive layer 22 arranged in contact with the elastomeric body 20. The mechanical drive layer 22 is provided with several ribs 24 that each extend along a general direction Y substantially perpendicular to a longitudinal direction X of the belt P. Each rib 24 has a trapezoidal shape in cross section. The general directions of the ribs 24 are substantially parallel to one another. The ribs 24 extend over the entire length of the belt P. These ribs 24 are intended to be engaged in the recesses or grooves of complementary shape, for example borne by pulleys on which the belt is intended to be mounted.

The elastomeric body 20 is formed on the one hand by a first elastomeric layer 26 made from a first elastomeric material and on the other hand by a second elastomeric layer 28 made from a second elastomeric material. The mechanical drive layer 22 is formed by a third layer made from a third elastomeric material.

Each first and second elastomeric material comprises a reinforcing filler, here carbon black (10 to 100 phr), an α, β-unsaturated organic acid metal salt, here zinc monomethacrylate (2 to 50 phr), an agent for dispersing the reinforcing filler (1 to 10 phr), an antioxidant (0.5 to 8 phr), an organic peroxide (0.5 to 8 phr), a co-crosslinking agent (0.5 to 5 phr by weight) and a plasticizer (1 to 20 phr by weight).

At least one of the first and second elastomeric materials, and therefore the elastomeric body 20, also comprises at least one elastomer selected from the group consisting of an ethylene/alpha-olefin type elastomer, a polychloroprene elastomer (CR), and the mixtures of these elastomers. In this case, each first and second elastomeric material comprises a mixture of natural rubber (NR) and of an ethylene-propylene-diene copolymer (EPDM), the proportion of natural rubber being less than 30 phr.

The third elastomeric material is made from an elastomeric composition comprising at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers. In this case, the elastomer of the elastomeric composition of the third elastomeric material is selected from the group consisting of an ethylene/alpha-olefin type elastomer, a polychloroprene elastomer (CR), a polybutadiene (BR), a natural rubber (NR), a butadiene-styrene copolymer (SBR) and the mixtures of these elastomers. Here, the elastomer of the elastomeric composition of the third elastomeric material is an ethylene/alpha-olefin type elastomer, for example an ethylene-propylene copolymer (EPM), an ethylene-propylene-diene copolymer (EPDM) or a mixture of these copolymers.

Represented in FIGS. 2A and 2B are two variants of coated reinforcing elements R in accordance with the invention. Represented in FIG. 2A is a reinforcing element R comprising a reinforcing element 10 impregnated with a cohesion composition 12 described below, directly coated with an adhesive layer 14 made from an adhesive composition C2 described below. The reinforcing element 10 comprises several multifilament plies of elementary monofilaments 18, here monofilaments made of polyamide, in this case nylon 4-6. Unlike the reinforcing element R from FIG. 1A, the reinforcing element from FIG. 1B is devoid of cohesion composition 12. In these variants from FIGS. 2A and 2B, the elastomeric body 20 directly coats the adhesive layer 14.

Represented in FIGS. 3A and 3B are two other variants of coated reinforcing elements R. Unlike the coated reinforcing elements R from FIGS. 2A and 2B, the coated reinforcing elements R from FIGS. 3A and 3B comprise an elastomeric bonding layer 16 that directly coats the adhesive layer 14. In these variants from FIGS. 3A and 3B, the elastomeric body 20 directly coats the elastomeric bonding layer 16. The elastomeric bonding composition comprises at least one elastomer selected from the group consisting of an ethylene/alpha-olefin type elastomer, a polychloroprene elastomer (CR), and the mixtures of these elastomers. In this case, the elastomeric bonding composition comprises a mixture of natural rubber (NR) and of an ethylene-propylene-diene copolymer (EPDM), the proportion of natural rubber being less than 30 phr.

A process will now be described for manufacturing the belt P be it in the case of the variants from FIG. 2A, 2B or 3A, 3B of the coated reinforcing elements R.

Firstly, for the coated reinforcing elements R from FIGS. 2A and 3A, the process comprises a step of impregnating each reinforcing element 10 with the cohesion composition 12. In order to do this, the reinforcing element 10 is run through a bath generally based on isocyanate in a solvent, for example based on toluene.

Next, the process comprises a step of coating the reinforcing element with the adhesive composition C0. In order to do this, the reinforcing elements are run through the adhesive composition C0, then the reinforcing elements thus coated are dried in a drying oven at 140° C. for 30 s. Next the adhesive composition is crosslinked by passing the coated reinforcing elements through a treatment oven at 240° C. for 30 s.

Then, for the coated reinforcing elements R from FIGS. 3A and 3B, during a subsequent step, the process comprises a step of coating the adhesive layer directly with an elastomeric bonding composition. In this case, the adhesive layer C0 is directly coated with the elastomeric bonding composition by extruding a sheath of the elastomeric bonding composition around the reinforcing element coated with the adhesive layer layer. Reinforcing elements coated with the adhesive layer made from the adhesive composition, the adhesive layer being directly coated with the elastomeric bonding layer made from the elastomeric bonding composition, are then obtained. The elastomeric bonding layer then forms a sheath around the reinforcing element.

Next, in the uncured state, i.e. in the non-crosslinked state, a stack is arranged comprising in this order:

the first elastomeric layer 26 made from the first elastomeric material, several reinforcing elements R as described above, the second elastomeric layer 28 made from the second elastomeric material, the third elastomeric layer 22 in contact with the second elastomeric layer 28 and made from the third elastomeric material.

Then, after this arranging step, the stack in the uncured state is manipulated and placed in a mould. The stack obtained previously is moulded and crosslinked. The belt P from FIG. 1 is then obtained.

Four aqueous adhesive compositions were prepared, one in accordance with the invention (hereinafter denoted C0) and three not in accordance with the invention (control compositions, hereinafter denoted T0, T1 and T2). Their formulations (expressed as percentage by weight) are presented in Table 1 below. The amounts listed in this table are those of the constituents in the dry state, with respect to a total of 100 parts by weight of aqueous adhesive composition (that is to say, the constituents plus the water).

The control compositions T0 and T1 are conventional RFL adhesives.

The control composition T2 is an aqueous adhesive composition comprising a phenol-aldehyde resin based on 1,4-benzenedicarboxaldehyde and phloroglucinol.

The composition C0 comprises at least one resin based on at least:

on at least one aromatic polyphenol comprising at least one aromatic ring bearing at least two hydroxyl functions in the meta position relative to one another, the two positions ortho to at least one of the hydroxyl functions being unsubstituted, and/or on at least one aromatic monophenol comprising at least one six-membered aromatic ring bearing a single hydroxyl function, the two positions ortho to the hydroxyl function being unsubstituted, or at least one position ortho to and the position para to the hydroxyl function being unsubstituted, and on at least one aromatic compound comprising at least one aromatic ring bearing at least two functions, one of these functions being a hydroxymethyl function and the other being an aldehyde function or a hydroxymethyl function.

Regarding the aromatic polyphenol, the aromatic ring of the aromatic polyphenol bears three hydroxyl functions in the meta position relative to one another. The two positions ortho to each hydroxyl function are unsubstituted. The remainder of the aromatic ring of the aromatic polyphenol is unsubstituted. Here, the polyphenol comprises a single aromatic ring and this aromatic ring is a benzene ring. The polyphenol is selected from the group consisting of resorcinol, phloroglucinol, 2,2',4,4'-tetrahydroxydiphenyl sulfide, 2,2',4,4'-tetrahydroxybenzophenone, resins pre-condensed from at least one of these aromatic polyphenols and the mixtures of these compounds. Here, this is phloroglucinol.

The aromatic compound, the aromatic ring is 5-(hydroxymethyl)furfural.

The adhesive composition also comprises an unsaturated elastomer latex comprising one or more elastomers. In this case, the unsaturated elastomers of the latex are diene elastomers, preferably selected from the group consisting of polybutadienes, butadiene copolymers, polyisoprenes, isoprene copolymers, vinylpyridine-styrene-butadiene terpolymers, ethylene/alpha-olefin type elastomers, polychloroprene elastomers and the mixtures of these elastomers. Here, this is an NR/SBR/VP-SBR mixture.

Wettability Test

The wettability test is carried out according to the standard ASTM D-1417-10. For each adhesive composition the surface tension expressed in millinewtons per metre (i.e. in dynes per centimetre) is measured. The higher the value of the surface tension, the less likely the adhesive composition is to correctly spread over the material that it is intended to coat. Conversely, the lower the surface tension value, the better the wettability of the adhesive composition.

A value higher than that of the test carried out using the composition T1, arbitrarily set at 100, indicates an improved result, i.e. a wettability greater than that of the control composition. The results of the tests carried out on the adhesive compositions are summarized in Table 1. The note "NM" means that the measurement was not carried out.

Solubilization Test

The solubility of each adhesive composition was also tested according to the following protocol. Firstly, the adhesive composition was stirred at a given stirring speed using a conventional magnetic bar type stirrer. In the absence of solubilization of the adhesive composition at this stirring speed and using this conventional stirrer, the stirring speed was gradually increased. If, at the maximum stirring speed of the conventional stirrer, no solubilization of the adhesive composition was observed then, secondly, the adhesive composition was stirred at a given stirring speed using an Ultra-Turrax type stirrer.

The need to use an Ultra-Turrax type stirrer and also the stirring speed necessary for the solubilization of the adhesive composition have been indicated in Table 1 below. A low stirring speed is indicated by the sign "+". A medium stirring speed is indicated by the sign "++". A high stirring speed is indicated by the sign "+++".

TABLE 1

| Adhesive compositions | T0 | T1 | T2 | C0 |
|---|---|---|---|---|
| Aldehyde: | | | | |
| Formaldehyde (1) | 0.9 | 0.7 | — | — |
| 1,4-Benzenedicarboxaldehyde (2) | — | — | 0.9 | — |
| Aromatic compound | | | | |
| 5-(hydroxymethyl)furfural (3) | — | — | — | 1.3 |
| Polyphenol: | | | | |
| Resorcinol (4) | 1.7 | | | |
| SRF 1524 (5) | — | 1.9 | — | — |
| Phloroglucinol (6) | — | — | 1.7 | 1.3 |
| Sodium hydroxide (7) | 0.2 | 0.2 | 0.2 | 0.2 |

TABLE 1-continued

| Adhesive compositions | T0 | T1 | T2 | C0 |
|---|---|---|---|---|
| Elastomer latex: | | | | |
| NR (8) | 6.4 | 6.4 | 6.4 | 6.4 |
| SBR (9) | 3.2 | 3.2 | 3.2 | 3.2 |
| VP-SBR (10) | 6.4 | 6.4 | 6.4 | 6.4 |
| Aqueous ammonia (11) | 0.5 | 0.5 | 0.5 | 0.5 |
| Total weight of solids of adhesive composition | 19.3 | 19.3 | 19.3 | 19.3 |
| Weight of water | 80.7 | 80.7 | 80.7 | 80.7 |
| Wettability | NM | 100 | 79 | 105 |
| Need for an Ultra-Turrax type mixer | No | No | Yes | No |
| Stirring speed | + | + | +++ | + |

(1) Formaldehyde (from Caldic; diluted to 36%);
(2) 1,4-Benzenedicarboxaldehyde (from ABCR; purity of 98%);
(3) 5-(hydroxymethyl)furfural (HMF);
(4) Resorcinol (from Sumitomo; purity of 99.5%);
(5) Pre-condensed resin SRF 1524 (from Schenectady; diluted to 75%);
(6) Phloroglucinol (from Alfa Aesar; purity of 99%);
(7) Sodium hydroxide (from Aldrich; diluted to 30%);
(8) NR Latex ("Trang Latex" from Bee tex; diluted to 61% by weight);
(9) SBR Latex ("Encord-201" from Jubilant; diluted to 41% by weight);
(10) Vinylpyridine-styrene-butadiene latex ("VP 106S" from Eliokem; diluted to 41%);
(11) Aqueous ammonia (from Aldrich; diluted to 21%).

Compared to an RFL type adhesive composition T0, the composite according to the invention using an adhesive composition C0 has a significantly higher pull-out force, whether this is with or without a cohesion composition.

The adhesive composition C0 makes it possible to obtain, in a composite in which the coated reinforcing elements are devoid of cohesion composition directly coating the reinforcing element, a higher degree of adhesion compared to a composite in which the reinforcing elements are directly coated with a cohesion composition, that is itself coated with the layer of adhesive composition of RFL type or comprising a resin of phenol-aldehyde resin type. In other words, the composition C0 makes it possible to do without the cohesion composition with superior performance.

Surprisingly, the wettability is significantly improved for the composition C0 compared to that of the control compositions T1 and T2.

The composition C0 is easier to solubilize and only requires gentle stirring for it to dissolve in water whereas vigorous stirring is required for the control composition T2 (for the control compositions T0 and T1, the formaldehyde is readily soluble in water) to prevent the appearance of residues.

Whereas in the case of an elastomeric material that does not use an elastomer of ethylene/alpha-olefin type, here natural rubber, the use of the adhesive composition makes it possible to maintain the degree of adhesion, the use of an elastomeric material comprising an elastomer of ethylene/alpha-olefin type enables, unexpectedly, a gain in adhesion in the case of a reinforcing element directly coated with a cohesion composition and with an adhesive layer and in the case of a reinforcing element directly coated with the layer of adhesive composition.

Pull-Out Test

Test 1: Adhesion of Nylon 6,6 Textile Cords

For this, three aqueous adhesive compositions were prepared as indicated above, one in accordance with the invention (hereinafter denoted C1) and two not in accordance with the invention (control compositions, hereinafter denoted T1-1 and T1-2). Their formulations (expressed as percentage by weight) are presented in the appended Table 2. The amounts listed in this table are those of the constituents in the dry state, with respect to a total of 100 parts by weight of aqueous adhesive composition (that is to say, the constituents plus the water).

The adhesive composition T1-1 is a control composition, of RFL type, commonly used for the adhesion of polyamide cords to a polychloroprene composition. This adhesive composition is based on resorcinol and formaldehyde.

The aqueous adhesive composition T1-2 a control composition based on 1,4-benzenedicarboxaldehyde and phloroglucinol.

The aqueous adhesive composition C1 according to the invention is based on phloroglucinol and on 5-(hydroxymethyl)furfural.

These adhesive compositions T1-1, T1-2 and C1 all comprise a polychloroprene latex.

The polyamide (nylon-6,6) cords consist of two-strand plied yarns of 140×2 (count of each strand equal to 140 tex) and 250/250 (twist in t/m) construction; they were sized with each of these 3 aqueous adhesive compositions T1-1, T1-2 and C1, then dried in a drying oven at 180° C. for 60 s. The adhesive composition was then crosslinked by passing the textile cords through a treatment oven at 230° C. for 60 s. The assembly was then unified by crosslinking with a polychloroprene composition, by means of a vulcanization heat treatment, to form composite test specimens as described below.

The quality of the bonding between the polychloroprene composition and the textile material is then determined by a test in which the force necessary to extract sections of cords made of textile material from the crosslinked polychloroprene composition is measured. This polychloroprene composition is a conventional composition that can be used for the manufacture of power transmission belts.

More specifically, the vulcanizate is a polychloroprene block consisting of two sheets measuring 200 mm by 4.5 mm and with a thickness of 3.5 mm, applied against one another before curing (the thickness of the resulting block is then 7 mm). It is during the production of this block that the textile cords (15 sections in total) are trapped between the two polychloroprene sheets in the uncured state, an equal distance apart and while allowing a cord end to project out on either side of these sheets with a length sufficient for the subsequent pulling. The block comprising the cords is then placed in a suitable mould and then crosslinked under pressure. The crosslinking temperature and time are adapted to the intended test conditions and left to the discretion of a person skilled in the art; by way of example, in the present case, the block is crosslinked at 185° C. for 9 min.

After crosslinking, the test specimen, thus consisting of the crosslinked block and the 15 sections of cords, is placed between the jaws of a suitable tensile testing machine in order to make it possible to test each section individually, at a given rate and a given temperature (for example, in the present case, at 100 mm/min and 20° C.).

The adhesion levels are characterized by measuring the "pull-out" force (denoted by Fmax) for pulling the reinforcers out of the test specimen. A value greater than that of the control test specimen, arbitrarily set at 100, indicates an improved result, that is to say, a pull-out force greater than that of the control test specimen. The results of the tests carried out on the test specimens are summarized in Table 2.

It is found that the textile cords sized with the adhesive composition C1 according to the invention have a pull-out force Fmax which is particularly high and unexpected for a person skilled in the art since it is increased at ambient temperature (20° C.), compared to the reference pull-out force measured on the control textile cord sized with the conventional "RFL" adhesive T1-1, or is very substantially increased compared to those sized with the composition T1-2.

TABLE 2

| Adhesive compositions | T1-1 | T1-2 | C1 |
|---|---|---|---|
| Aldehyde: | | | |
| Formaldehyde (1) | 0.7 | — | — |
| 1,4-Benzenedicarboxaldehyde (2) | — | 0.9 | — |
| Aromatic compound | | | |
| 5-(hydroxymethyl)furfural (3) | — | — | 0.9 |
| Polyphenol: | | | |
| SRF 1524 (4) | 2.1 | — | — |
| Phloroglucinol (5) | — | 1.8 | 1.8 |
| Sodium hydroxide (6) | 0.1 | 0.2 | 0.2 |
| Elastomer latex: | | | |
| VP-SBR (7) | — | — | — |
| polychloroprene (8) | 17.0 | 17.0 | 17.0 |
| Aqueous ammonia (9) | 0.5 | 0.5 | 0.5 |
| Total weight of solids of adhesive composition | 20.4 | 20.4 | 20.4 |
| Weight of water | 79.6 | 79.6 | 79.6 |
| Adhesion tests | | | |
| $F_{max}$ at 20° C. | 100 | 153 | 157 |
| Wettability | 100 | 101 | 114 |
| Need for an Ultra-Turrax type mixer | No | Yes | No |
| Stirring speed | + | +++ | + |

(1) Formaldehyde (from Caldic; diluted to 36%);
(2) 1,4-Benzenedicarboxaldehyde (from ABCR; purity of 98%);
(3) 5-(hydroxymethyl)furfural (HMF);
(4) Pre-condensed resin SRF 1524 (from Schenectady; diluted to 75%);
(5) Phloroglucinol (from Alfa Aesar; purity of 99%);
(6) Sodium hydroxide (from Aldrich; diluted to 30%);
(7) Vinylpyridine-styrene-butadiene latex ("VP 106S" from Eliokem; diluted to 41%);
(8) Polychloroprene latex ("LM-61" from Denka; diluted to 61%)
(9) Aqueous ammonia (from Aldrich; diluted to 21%).

Test 2: Adhesion of Nylon 4,6 Textile Cords

Unlike test 1, the adhesion is carried out on polyamide (polyamide-4,6) cords consisting of two-strand plied yarns of 140×2 (count of each strand equal to 140 tex) and 250/250 (twist in t/m) construction; they were sized with each of these 3 aqueous adhesive compositions T2-1, T2-2 and C2.

Three aqueous adhesive compositions were prepared as indicated above, one in accordance with the invention (hereinafter denoted C2) and two not in accordance with the invention (control compositions, hereinafter denoted T2-1 and T2-2). Their formulations (expressed as percentage by weight) are presented in the appended Table 3. The amounts listed in this table are those of the constituents in the dry state, with respect to a total of 100 parts by weight of aqueous adhesive composition (that is to say, the constituents plus the water).

The adhesive composition T2-1 is a control composition, of RFL type, commonly used for the adhesion of polyamide cords to a rubber composition. This adhesive composition is based on resorcinol and formaldehyde.

The aqueous adhesive composition T2-2 is a control composition based on 1,4-benzenedicarboxaldehyde and phloroglucinol.

The aqueous adhesive composition C2 according to the invention is based on phloroglucinol and on 5-(hydroxymethyl)furfural.

These adhesive compositions T2-1, T2-2 and C2 comprise a latex of vinylpyridine-styrene-butadiene terpolymers (VP-SBR).

Unlike test 1, use is made here of an EPDM composition.

TABLE 3

| Adhesive compositions | T2-1 | T2-1 | C2 |
|---|---|---|---|
| Aldehyde: | | | |
| Formaldehyde (1) | 0.7 | — | — |
| 1,4-Benzenedicarboxaldehyde (2) | — | 0.9 | — |
| Aromatic compound | | | |
| 5-(hydroxymethyl)furfural (3) | — | — | 0.9 |
| Polyphenol: | | | |
| SRF 1524 (4) | 1.9 | | |
| Phloroglucinol (5) | — | 1.7 | 1.7 |
| Sodium hydroxide (6) | 0.1 | 0.2 | 0.2 |
| Elastomer latex: | | | |
| VP-SBR (7) | 16.0 | 16.0 | 16.0 |
| Aqueous ammonia (8) | 0.5 | 0.5 | 0.5 |
| Total weight of solids of adhesive composition | 19.3 | 19.3 | 19.3 |
| Weight of water | 80.7 | 80.7 | 80.7 |
| Adhesion tests | | | |
| $F_{max}$ at 20° C. | 100 | 173 | 148 |
| Need for an Ultra-Turrax type mixer | No | Yes | No |
| Stirring speed | + | +++ | + |

(1) Formaldehyde (from Caldic; diluted to 36%);
(2) 1,4-Benzenedicarboxaldehyde (from Chem Pacific; purity of 98%);
(3) 5-(hydroxymethyl)furfural (HMF);
(4) Pre-condensed resin SRF 1524 (from Schenectady; diluted to 75%);
(5) Phloroglucinol (from Beckmann-Kenko; purity of 99%);
(6) Sodium hydroxide (from Aldrich; diluted to 30%);
(7) Vinylpyridine-styrene-butadiene latex ("VP 106S" from Eliokem; diluted to 41%);
(8) Aqueous ammonia (from Aldrich; diluted to 21%).

It is found that the textile cords sized with the adhesive composition C2 according to the invention have a pull-out force Fmax which is particularly high and unexpected for a person skilled in the art since it is increased at ambient temperature (20° C.), compared to the reference pull-out force measured on the control textile cord sized with the conventional "RFL" adhesive T2-1. Although lower than the pull-out force of the composition T2-2, the pull-out force of the composition C2 is sufficient and the composition C2 according to the invention is much easier to use than the composition T2-2.

In conclusion, the results of these various tests clearly demonstrate that the adhesive compositions according to the invention constitute an improvement to the use of the adhesives of the prior art.

The invention is not limited to the embodiments described above.

It could also be envisaged to use a composite in which the reinforcing element is metallic. Thus, the metallic reinforcing element would comprise one or more elementary metallic monofilaments each comprising a steel core. In one embodiment, the adhesive layer directly coats the steel core of the or each elementary metallic monofilament. In another embodiment, the adhesive layer directly coats a layer of a metallic coating directly coating the steel core of the or each elementary metallic monofilament. The metal of the layer of the metallic coating directly coating the steel core of the or each elementary metallic monofilament is selected from zinc, copper, tin and the alloys of these metals. Advantageously, the adhesive layer directly coats a nonmetallic intermediate adhesive layer coating the steel core of the or each elementary metallic monofilament.

The invention claimed is:

1. A process for manufacturing a composite, the process comprising:
arranging, in an uncured state, a stack comprising, in this order:
   a first elastomeric layer made from a first elastomeric material;
   at least one reinforcing element coated with an adhesive layer made from an adhesive composition, the adhesive composition comprising at least one resin based
      on at least one aromatic polyphenol comprising at least one aromatic ring bearing at least two hydroxyl functions in the meta position relative to one another, the two positions ortho to at least one of the hydroxyl functions being unsubstituted, and/or
      on at least one aromatic monophenol comprising at least one six-membered aromatic ring bearing a single hydroxyl function,
         the two positions ortho to the single hydroxyl function being unsubstituted, or
         at least one position ortho to and the position para to the single hydroxyl function being unsubstituted, and
      on at least one aromatic compound comprising at least one aromatic ring bearing at least two functions, one function being a hydroxymethyl function and another function being an aldehyde function or a hydroxymethyl function; and
   a second elastomeric layer made from a second elastomeric material, at least one of the first and second elastomeric materials comprising at least one elastomer selected from the group consisting of an ethylene/alpha-olefin elastomer, a polychloroprene elastomer (CR) and mixtures thereof; and
moulding and crosslinking the stack.

2. A process for manufacturing a power transmission belt, the process comprising:
arranging, in an uncured state, a stack comprising, in this order:
   a first elastomeric layer made from a first elastomeric material;
   at least one reinforcing element coated with an adhesive layer made from an adhesive composition, the adhesive composition comprising at least one resin based
      on at least one aromatic polyphenol comprising at least one aromatic ring bearing at least two hydroxyl functions in the meta position relative to one another, the two positions ortho to at least one of the hydroxyl functions being unsubstituted, and/or
      on at least one aromatic monophenol comprising at least one six-membered aromatic ring bearing a single hydroxyl function,
         the two positions ortho to the single hydroxyl function being unsubstituted, or
         at least one position ortho to and the position para to the single hydroxyl function being unsubstituted, and
      on at least one aromatic compound comprising at least another aromatic ring bearing at least two functions, one function being a hydroxymethyl function and one function being an aldehyde function or a hydroxymethyl function;

a second elastomeric layer made from a second elastomeric material, at least one of the first and second elastomeric materials comprising at least one elastomer selected from the group consisting of an ethylene/alpha-olefin elastomer, a polychloroprene elastomer (CR) and mixtures thereof; and a third elastomeric mechanical drive layer arranged in contact with the second elastomeric layer and made from a third elastomeric material; and moulding and crosslinking the stack.

3. A composite comprising:
at least one reinforcing element;
an adhesive layer made from an adhesive composition and coating the at least one reinforcing element;
an elastomeric body made from an elastomeric matrix comprising at least one elastomer selected from the group consisting of an ethylene/alpha-olefin elastomer, a polychloroprene elastomer and mixtures thereof, the at least one reinforcing element coated with the adhesive layer being embedded in the elastomeric body,
wherein the adhesive composition comprises at least one resin based:
on at least one aromatic polyphenol comprising at least one aromatic ring bearing at least two hydroxyl functions in the meta position relative to one another, the two positions ortho to at least one of the hydroxyl functions being unsubstituted, and/or
on at least one aromatic monophenol comprising at least one six-membered aromatic ring bearing a single hydroxyl function,
the two positions ortho to the single hydroxyl function being unsubstituted, or
at least one position ortho to and the position para to the single hydroxyl function being unsubstituted, and
on at least one aromatic compound comprising at least one aromatic ring bearing at least two functions, one function being a hydroxymethyl function and another function being an aldehyde function or a hydroxymethyl function.

4. The composite according to claim 3, wherein the at least one aromatic polyphenol is selected from the group consisting of resorcinol, phloroglucinol, 2,2',4,4'-tetrahydroxydiphenyl sulfide, 2,2',4,4'-tetrahydroxybenzophenone, resins pre-condensed from at least one of these aromatic polyphenols and mixtures thereof.

5. The composite according to claim 3, wherein the at least one aromatic compound corresponds to general formula (VII'a1) or (VII'2a):

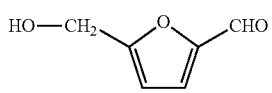

(VII'a1)

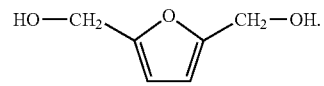

(VII'a2)

6. The composite according to claim 3, wherein the ethylene/alpha-olefin elastomer is selected from the group consisting of ethylene-propylene copolymers (EPM), ethylene-propylene-diene copolymers (EPDM), and mixtures thereof.

7. The composite according to claim 3, wherein the adhesive composition comprises at least one unsaturated elastomer latex.

8. The composite according to claim 7, wherein the at least one unsaturated elastomer latex is a diene elastomer selected from the group consisting of polybutadienes, butadiene copolymers, polyisoprenes, isoprene copolymers, vinylpyridine-styrene-butadiene terpolymers, ethylene/alpha-olefin elastomers, polychloroprene elastomers (CR) and mixtures thereof.

9. The composite according to claim 8, wherein the ethylene/alpha-olefin type elastomer of the at least one unsaturated elastomer latex is selected from the group consisting of ethylene-propylene copolymers (EPM), ethylene-propylene-diene copolymers (EPDM), and mixtures thereof.

10. The composite according to claim 3, wherein the at least one reinforcing element is nonmetallic.

11. The composite according to claim 3, wherein the elastomeric body directly coats the adhesive layer.

12. The composite according to claim 3 further comprising an elastomeric bonding layer made from an elastomeric bonding composition and directly coating the adhesive layer, the elastomeric bonding composition comprising at least one elastomer selected from the group consisting of an ethylene/alpha-olefin elastomer, a polychloroprene elastomer (CR) and mixtures thereof.

13. The composite according to claim 12, wherein the ethylene/alpha-olefin elastomer of the elastomeric bonding layer is selected from the group consisting of ethylene-propylene copolymers (EPM), ethylene-propylene-diene copolymers (EPDM) and mixtures thereof.

14. The composite according to claim 12, wherein the at least one elastomer of the elastomeric bonding composition is identical to the at least one elastomer of the elastomer matrix.

15. The composite according to claim 3, the composite forming a power transmission belt.

* * * * *